(12) United States Patent
Shibui et al.

(10) Patent No.: US 9,064,427 B2
(45) Date of Patent: Jun. 23, 2015

(54) MEDICAL TRAINING APPARATUS

(75) Inventors: Naotake Shibui, Tokyo (JP); Satoshi Uzuka, Tokyo (JP); Kiminari Nakamura, Tokyo (JP); Kazuo Nishikawa, Kyoto (JP); Mikinori Nishimura, Kyoto (JP); Teruji Nakai, Kyoto (JP); Tatsuo Matsuzaki, Tokyo (JP); Takeshi Kira, Tokyo (JP); Tadashi Shimaya, Tokyo (JP)

(73) Assignees: THE NIPPON DENTAL UNIVERSITY, Tokyo (JP); J. MORITA MANUFACTURING CORPORATION, Kyoto (JP); KOKORO COMPANY, LTD., Tokyo (JP)

( * ) Notice: Subject to any disclaimer, the term of this patent is extended or adjusted under 35 U.S.C. 154(b) by 1681 days.

(21) Appl. No.: 12/310,467
(22) PCT Filed: Jan. 24, 2007
(86) PCT No.: PCT/JP2007/051083
§ 371 (c)(1),
(2), (4) Date: Jun. 9, 2009
(87) PCT Pub. No.: WO2008/023464
PCT Pub. Date: Feb. 28, 2008

(65) Prior Publication Data
US 2010/0003657 A1 Jan. 7, 2010

(30) Foreign Application Priority Data
Aug. 25, 2006 (JP) ................. 2006-228679

(51) Int. Cl.
*G09B 23/30* (2006.01)
*G09B 23/28* (2006.01)
(Continued)

(52) U.S. Cl.
CPC ............... *G09B 23/28* (2013.01); *A61G 15/02* (2013.01); *A61G 15/14* (2013.01); *G09B 23/30* (2013.01)

(58) Field of Classification Search
USPC ............ 434/263, 258, 262, 267; 74/490.01; 607/134, 45; 600/544, 16, 587, 508; 5/424; 706/12
See application file for complete search history.

(56) References Cited

U.S. PATENT DOCUMENTS 5,480,307 A * 1/1996 Lang et al. .............. 434/263
5,688,118 A 11/1997 Hayka et al.
(Continued)

FOREIGN PATENT DOCUMENTS

DE 102 17 630 A 11/2003
JP S60-103953 6/1985
(Continued)

OTHER PUBLICATIONS

"Design Concept of a Human-like Robot Head" written by Karsten Berns, et al. at proceeding of 2005 5th IEEE-RAS International Conference on Humanoid Robots, 2005, pp. 32-37.
(Continued)

*Primary Examiner* — Robert J Utama
(74) *Attorney, Agent, or Firm* — DLA Piper LLP (US)

(57) ABSTRACT

A medical training apparatus comprising an instrument holder with a medical instrument, a model patient body simulating a patient subject to medical treatment or examination, and an examination table on which the model patient body is placed. The medical training apparatus comprises a posture detection means for detecting the posture of the examination table, a medical instrument status detection means for detecting the working status of the medical instrument, an examination receiving status detection means for detecting the situation of the model patient body in medical treatment or examination, and a model patient body driving means housed in the model patient body. The model patient body driving means changes the facial or body expression of the model patient body, depending on combination of at least one of the posture detection signal output from the posture detection means and the medical instrument status detection signal output from the medical instrument status detection means, and the examination receiving status detection signal output from the examination receiving status detection means.

22 Claims, 27 Drawing Sheets

(51) Int. Cl.
*A61G 15/02* (2006.01)
*A61G 15/14* (2006.01)

(56) References Cited

U.S. PATENT DOCUMENTS

| | | | |
|---|---|---|---|
| 6,077,083 A | 6/2000 | Smith-Whitley et al. | |
| 7,815,436 B2* | 10/2010 | Cunningham et al. | 434/262 |
| 7,976,313 B2* | 7/2011 | Eggert et al. | 434/268 |
| 8,096,006 B2* | 1/2012 | DeBraal et al. | 5/424 |
| 2003/0068605 A1* | 4/2003 | Kullok et al. | 434/258 |
| 2005/0183532 A1* | 8/2005 | Najafi et al. | 74/490.01 |
| 2005/0240253 A1* | 10/2005 | Tyler et al. | 607/134 |
| 2006/0111644 A1* | 5/2006 | Guttag et al. | 600/544 |
| 2006/0241718 A1* | 10/2006 | Tyler et al. | 607/45 |
| 2007/0038331 A1* | 2/2007 | Hanson | 700/245 |
| 2007/0060785 A1* | 3/2007 | Freeman et al. | 600/16 |
| 2007/0118054 A1* | 5/2007 | Pinhas et al. | 600/587 |
| 2007/0136218 A1* | 6/2007 | Bauer et al. | 706/12 |
| 2007/0276270 A1* | 11/2007 | Tran | 600/508 |
| 2008/0020361 A1* | 1/2008 | Kron et al. | 434/262 |
| 2008/0227073 A1* | 9/2008 | Bardsley et al. | 434/267 |
| 2010/0003657 A1* | 1/2010 | Shibui et al. | 434/267 |

FOREIGN PATENT DOCUMENTS

| | | |
|---|---|---|
| JP | H5-27675 | 2/1993 |
| JP | H5-29498 | 7/1993 |
| JP | H7-46949 | 10/1995 |
| JP | 2000-293097 | 10/2000 |
| JP | 2004-46102 | 2/2004 |
| JP | 2004-233585 | 8/2004 |
| JP | 2006-79124 | 3/2006 |

OTHER PUBLICATIONS

"Design of an Anthropomorphic Robot Head for Studying Autonomous Development and Learning" written by Hyundo Kim et al. at proceedings of the 2004 IEEE International Conf.
"Emotion and sociable humanoid robots" written by Cynthia Breazeal in International Journal of Human-Computer Studies, 59, by Elsevier Science Ltd. in 2003, pp. 119-155.

* cited by examiner posture before treatment relaxed expression to treatment posture by tilting and raising a little uneasy expression

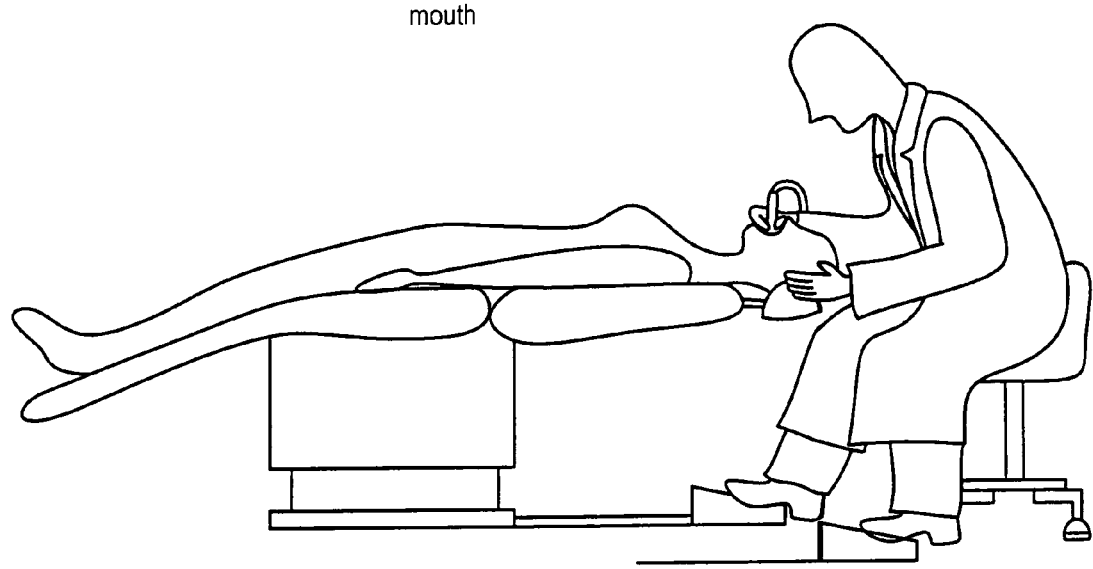
Fig.18a
 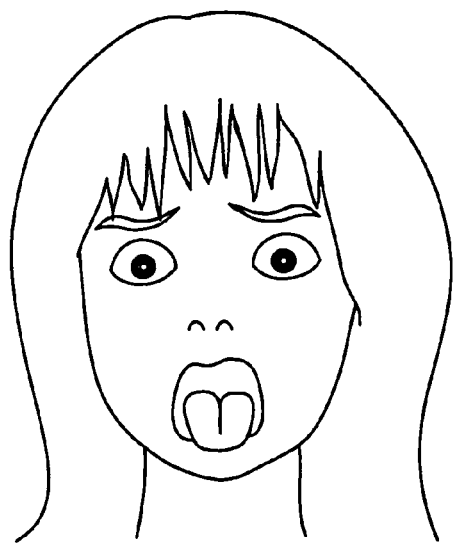
Fig.18b　　　Fig.18c

MEDICAL TRAINING APPARATUS

TECHNICAL FIELD

The present invention relates to a newly developed medical training apparatus in which the expression and movement such as uneasy feeling and pain of an actual patient are designed to be represented considering the posture of an examination table or the working status of medical instruments and using a model patient body.

BACKGROUND ART

Recently, laboratory teaching has been done in the medical education, specifically in the dental education, in such a way that teeth implanted in a human head model are cut. There are following patent documents as a prior art relating to such a medical training apparatus.

Published patent application No. JP-60-103953-A (Patent Document 1) discloses a grinding simulation apparatus for medical treatment (FIG. 1) in which an electronic balance apparatus detects the load applied on a holder grasping a dental arch, namely it detects the pushing force of a hand piece, a thermocouple sensor inserted and fitted in the dental arch model detects temperature increase at the time of cutting, and an acceleration sensor provided for the holder detects vibration at cutting.

Published patent application No. JP-5-27675-A (Patent Document 2) discloses a simulation apparatus for dental training (FIG. 1) which comprises a jaw model implanting a tooth for training (FIG. 2) and a detector for detecting cutting status of the tooth for training and in which a cutting hand piece detects a minute voltage change by the electrostatic energy accumulated in an operator caused when the tip end of a cutting bar contacts a part corresponding to dentine and when it contacts a part corresponding to cavitas dentis.

The document also discloses a simulation apparatus for dental training (FIG. 4) in which an externally cylindrical member (FIG. 5) is provided for a position of the jaw model corresponding to a conduction anesthesia hole, the cylindrical member being embedded while being filled with a conducting material. When an injection needle is run into the position where the conducting material exists at an accurate angle and depth (FIG. 6), the apparatus electrically detects the potential change of the conducting material.

Examined utility model application publication No.7-46949-Y (Patent Document 3) teaches a head model for dental training (FIG. 8, FIG. 9) in which an articulator reproducing the occlusal movement of a human being is detachably mounted in a craniofacial model.

Published patent application No. JP-2000-293097-A (Patent Document 4) teaches a human model for training of trainee and a medical training apparatus (FIG. 1) for taking a picture of the position of the trainee or that of a training instrument for training during training and for showing the movement locus (FIG. 10).

Further, published patent application No. JP-2004-233585-A (Patent document 5) teaches a medical simulator which detects the treatment status for a model patient body (FIG. 2) having a head model by means of a sensor provided in its mouth, executes drive control of the eyes and eyelids of the model patient body and reproduces the movement and expression of an actual patient.
[Patent Document 1] JP-60-103953-A
[Patent Document 2] JP-5-27675-A
[Patent Document 3] JP-7-46949-Y
[Patent Document 4] JP-2000-293097-A
[Patent Document 5] JP-2004-233585-A

DISCLOSURE OF INVENTION

Problems to be Solved in the Invention

In the above-mentioned documents 1-4, a medical training is possible for teeth, however, the training apparatus does not reflect the expression and movement of a patient so that there is a problem that there is a large difference between the actual medical treatment scene and training in practical steps cannot be done.

On the other hand, according to the medical simulator in the patent document 5, the model patient body moves like a patient before treatment, at the time of starting medical treatment, and during medical treatment, so that there is an effect that more practical training can be done. Further, the model patient body expresses the same movement and expression as the patient for an inappropriate medical treatment act, so that correction or handling for an inappropriate medical treatment act can be educated and evaluated.

However, according to the medical simulator in the patent document 5, whether an inappropriate medical treatment is done or not is judged by the expression of the model patient body output from several sensors provided for the model patient body and the information on the treatment table or the medical instruments is not designed to be detected or recorded at all. Therefore, inappropriate medical treatment act caused by the treatment table or the medical instruments are not adequately inquired or analyzed, thereby having a problem such that it is difficult to be served to improve the inappropriate operation for the treatment table and the medical instruments.

The present invention has an object to provide a medical training apparatus having an instrument holder provided with medical instruments, a model patient body simulating a patient to be examined, and an examination table on which the model patient body is placed, in which the detection signal on the treatment table and the medical instrument is taken in and the expression and movement of the model patient body during examination are perceived by a trainee, thereby providing a comfortable medical environment for a patient and facilitating correction and analysis of inappropriate examination.

Means to Solve the Problems

The medical training apparatus described in claim 1 comprising an instrument holder with medical instruments, a model patient body simulating a patient subject to medical treatment or examination, and an examination table on which the model patient body is placed comprises: a posture detection means for detecting the posture of the examination table; a medical instrument status detection means for detecting the working status of the medical instruments; an examination receiving status detection means for detecting the situation of the model patient body under medical treatment or examination; and a model patient body driving means housed in the model patient body. The model patient body driving means changes the facial or body expression of the model patient body, depending on combination of at least one of the posture detection signal output from the posture detection means and the medical instrument status detection signal output from the medical instrument status detection means, and the examination receiving status detection signal output from the examination receiving status detection means.

According to claim 2, the medical training apparatus further comprises a display means for displaying at least one of the posture detection signal, the medical instrument status detection signal and the examination receiving status detection signal.

The medical training apparatus described in claim 3 comprising an instrument holder with medical instruments, a model patient body simulating a patient subject to medical treatment or examination, and an examination table on which the model patient body is placed comprises: at least one of a medical instrument status detection means for detecting the working status of the medical instruments and an examination receiving status detection means for detecting the situation of the model patient body under medical treatment or examination; a model patient body driving means for changing the facial or body expression of the model patient body; a memory means for storing the medical instrument status detection signal output from the medical instrument status detection means or the examination receiving status detection signal output from the examination receiving status detection means; and a training result evaluation means for evaluating the result of medical training after comparing an evaluation criteria stored in advance in a memory means with the detection result based on at least one of the medical instrument detection signal and the examination receiving status detection signal.

According to claim 4, the medical training apparatus further comprises a display means for displaying at least one of the posture detection signal, the medical instrument status detection signal and the examination receiving status detection signal; and a model patient body control/operation means for controlling the model patient body driving means by a selecting operation.

According to the medical training apparatus described in claim 5, the model patient body control/operation means has a memory means for storing different facial or body expressions in advance by combining movement of eyes, eyelids, and a mouth of the model patient body driving means and has an expression selection means for selecting a specific expression from the different expressions in face or body, and the model patient body driving means is controlled and driven by operating the model patient body control/operation means so as to perform the expressions selected by the expression selection means.

According to the medical training apparatus described in claim 6, the examination table comprises a sitting seat movable up and down, a tiltable back seat connected to the rear end of the sitting seat, and a tiltable headrest connected to the upper end of the back seat.

According to the medical training apparatus described in claim 7, the model patient body is connected to at least one of an electric driving system and a fluid driving system relative to the examination table.

According to the medical training apparatus described in claim 8, the model patient body has a head model with eyes, a nose and a mouth cavity and the mouth cavity has a jaw model.

According to the medical training apparatus described in claim 9, the model patient body driving means drives at least one of the eyes, eyelids, jaw and neck provided in the model patient body.

According to the medical training apparatus described in claim 10, the medical instrument status detection means detects at least one of the following factors: the voltage or the current value corresponding to the rotation number of the medical instruments; the air pressure, the air flow amount, the frequency, the vibration number of the instruments when operated; the suppress strength to an affected part of the model patient body; the detection signal of picking up the medical instrument from the instrument holder; the operation signal of a foot controller connected to the examination table; and the operation signal of an operation means provided in the medical instrument.

According to the medical training apparatus described in claim 11, the posture detection means detects at least one of the elevating position of the sitting seat, the tilting angle of the back seat, and the tilting angle of the headrest.

According to the medical training apparatus described in claim 12, the examination receiving status detection means has at least one of a contact sensor provided for a cheek member of the head model, and a temperature sensor, a contact sensor, an angle sensor, a pressure sensor, a conduction sensor, a vibration sensor, and an impact sensor provided for the jaw model.

According to the medical training apparatus described in claim 13, an imaging means is further provided for photographying the medical treatment or examination status of the model patient body.

According to the medical training apparatus described in claim 14, the model patient body has an audio output means for outputting a predetermined voice in response to the examination receiving status detection signal.

According to the medical training apparatus described in claim 15, the model patient body is so constructed as to be detachably placed on the examination table via a coupling means. In this case, as described in claim 16, the model patient body may have a driving system connecting portion in the model patient body driving means side, the connecting portion being connectable to at least one of a connecting portion of an electric driving system and a connecting portion of a fluid driving system provided in the examination table when coupled via the coupling means. Further, as described in claim 17, the examination table may have a sitting seat movable up and down, a tiltable back seat connected to the rear end of the sitting seat, and a tiltable headrest connected to the upper end of the back seat; the model patient body may have a head portion, a trunk portion including a hip portion and a back portion, and a leg portion including a crural area; and the coupling means may be provided either between the trunk portion of the model patient body and the sitting seat or the back seat of the examination table, between the sitting seat and the crural area of the model patient body, or between the headrest of the examination table and the head portion of the model patient body.

According to the medical training apparatus described in claim 18, a model patient body control/operation means for controlling the model patient body driving means is provided on or at the vicinity of the examination table; and the model patient body control/operation means has a connecting portion for an electric driving system or a connecting portion for a fluid driving system; and the model patient body has a connecting portion for the driving system at the model patient body driving means side detachably connecting with at least more than one of the connecting portions.

According to the medical training apparatus described in claim 19, a system stop switch for urgently stopping an operating portion of the examination table and the model patient body is further provided. In this case, as mentioned in claim 20, the system stop switch may be preferably provided for the examination table.

According to the medical training apparatus described in claim 21, an operating medium of the model patient body driving means includes fluid such as gas and liquid; and an operation switch for releasing the model patient body in order to urgently remove a part of or all of the operating pressure of the fluid during operation is further provided. In this case, as mentioned in claim 22, the operation switch for releasing the model patient body may be preferably provided for the model patient body or the examination table.

Effect of the Invention

The medical training apparatus described in claim 1 comprising an instrument holder with medical instruments, a model patient body simulating a patient subject to medical treatment or examination, and an examination table on which the model patient body is placed comprises: a posture detection means for detecting the posture of the examination table; a medical instrument status detection means for detecting the working status of the medical instruments; an examination receiving status detection means for detecting the situation of the model patient body under medical treatment or examination; and a model patient body driving means housed in the model patient body. The model patient body driving means changes the facial or body expression of the model patient body, depending on combination of at least one of the posture detection signal output from the posture detection means and the medical instrument status detection signal output from the medical instrument status detection means, and the examination receiving status detection signal output from the examination receiving status detection means. Therefore, an inappropriate medical treatment caused by the treatment table and the medical instruments can be investigated and analyzed, thereby helping to improve an inappropriate operation for the examination table and the medical instruments. For example, when a trainee operates the examination table, if his examination posture is inappropriate or he inappropriately operates the medical instruments, the face of the model patient body may be designed to show an uneasy expression or a painful expression. Thus, the apparatus can detect the operation signal of the examination table or the medical instruments which makes the actual patient feel unpleasant or painful in addition to the examination receiving status detection signal incorporated into the model patient body to be reflected in the expression of the model patient body, thereby improving the inappropriate operation for the medical instruments and the examination table.

According to claim 2, the medical training apparatus further comprises a display means for displaying at least one of the posture detection signal, the medical instrument status detection signal and the examination receiving status detection signal. Therefore, the trainee can become aware of his inappropriate examination. Further, if such a display means is provided for an information processing unit such as GUI (Graphic User Interface, namely instruments having several kinds of output display means and operation means), a trainer can accurately comprehend the examination status of the trainee.

The medical training apparatus described in claim 3 comprising an instrument holder with medical instruments, a model patient body simulating a patient subject to medical treatment or examination, and an examination table on which the model patient body is placed comprises: at least one of a medical instrument status detection means for detecting the working status of the medical instruments and an examination receiving status detection means for detecting the situation of the model patient body under medical treatment or examination; a model patient body driving means for changing the facial or body expression of the model patient body; a memory means for storing the medical instrument status detection signal output from the medical instrument status detection means or the examination receiving status detection signal output from the examination receiving status detection means; and a training result evaluation means for evaluating the result of medical training after comparing an evaluation criteria stored in advance in a memory means with the detection result based on at least one of the medical instrument detection signal and the examination receiving status detection signal. Therefore, ranking like A, B and C depending on the skill of the trainee may be shown or the result of the training and the content of the inappropriate examination item may be shown.

According to claim 4, the medical training apparatus further comprises a display means for displaying at least one of the posture detection signal, the medical instrument status detection signal and the examination receiving status detection signal; and a model patient body control/operation means for controlling the model patient body driving means by a selecting operation. Therefore, the trainee can become aware of his inappropriate examination.

Further, in this case, if a display means is provided for the GUI as mentioned above, the operator such as a trainer can accurately comprehend the examination status of the trainee when he watches the display of the display means provided for the GUI. In addition, when he watches the output of the display means and the examination status and then selectively operates a model patient body operation means, the model patient can be designed to show a specific expression in face or body depending on the examination status.

According to the medical training apparatus described in claim 5, the model patient body control/operation means has a memory means for storing different facial or body expressions in advance by combining movement of eyes, eyelids, and a mouth of the model patient body driving means and has an expression selection means for selecting a specific expression from the different expressions in face or body, and the model patient body driving means is controlled and driven by operating the model patient body control/operation means so as to perform the expressions selected by the expression selection means. Therefore, an operator such as a trainer can accurately comprehend the examination status of the trainee. Further, when the operator such as a trainer operates the model patient body operation means while watching the output of several kinds of display means and the examination status, he makes the model patient body show the expression and movement memorized in advance, such as uneasy expression, painful expression, vomiting expression and the like, in order to be noticed by the trainee, thereby providing the trainee a substantially actual training.

According to the medical training apparatus described in claim 6, the examination table comprises a sitting seat movable up and down, a tiltable back seat connected to the rear end of the sitting seat, and a tiltable headrest connected to the upper end of the back seat. Therefore, the apparatus can be designed to have the same structure as the actual examination table for dental treatment and an actual training especially appropriate for dentistry can be easily executed.

According to the medical training apparatus described in claim 7, the model patient body is connected to at least one of an electric driving system and a fluid driving system relative to the examination table, thereby enabling to provide energy to the model patient body from the examination table. The examination table has the electric wiring and piping for supplying water or air, so that the back portion or the hip portion of the model patient body can be connected and fixed via the seat of the examination table and the electric wiring and the piping can be connected from the examination table. Therefore, such wiring and piping for the model patient body can be hardly seen from outside.

According to the medical training apparatus described in claim 8, the model patient body has a head model with eyes, a nose and a mouth cavity and the mouth cavity has a jaw model, thereby enabling the model patient body to resemble an actual patient head.

According to the medical training apparatus described in claim 9, the model patient body driving means drives at least one of the eyes, eyelids, jaw and neck provided in the model patient body, thereby expressing several expressions such as relieved expression, uneasy expression, painful expression, vomiting expression, displeased expression and so on.

According to the medical training apparatus described in claim 10, the medical instrument status detection means detects at least one of the following factors: the voltage or the current value corresponding to the rotation number of the medical instruments; the air pressure, the air flow amount, the frequency, the vibration number of the instruments when operated; the suppress strength to an affected part of the model patient body; the detection signal of picking up the medical instrument from the instrument holder; the operation signal of a foot controller connected to the examination table; and the operation signal of an operation means provided in the medical instrument. Therefore, the medical instrument status detection signal depending on the status of the several medical instruments can be detected to be reflected in the expression and movement of the model patient body depending on the detection signal.

According to the medical training apparatus described in claim 11, the posture detection means detects at least one of the elevating position of the sitting seat, the tilting angle of the back seat, and the tilting angle of the headrest. Therefore, such detection means can be provided in the treatment table, thereby enabling to produce the model patient body without complicating the structure thereof.

According to the medical training apparatus described in claim 12, the examination receiving status detection means has at least one of a contact sensor provided for a cheek member of the head model, and a temperature sensor, a contact sensor, an angle sensor, a pressure sensor, a conduction sensor, a vibration sensor, and an impact sensor provided for the jaw model, thereby detecting the stimulation to be received by the model patient body can be minutely detected.

According to the medical training apparatus described in claim 13, an imaging means is further provided for photographying the medical treatment or examination status of the model patient body, so that the examination status can be confirmed by a third person or by the trainee himself.

According to the medical training apparatus described in claim 14, the model patient body has an audio output means for outputting a predetermined voice in response to the examination receiving status detection signal. Therefore, the emotion of the model patient body can be shown to the trainee by the audio output like an actual patient. In addition, if the audio output is accompanied with the expression and movement, the trainee can experience training like the actual examination.

According to the medical training apparatus described in claim 15, the model patient body is so constructed as to be detachably placed on the examination table via a coupling means. Therefore, it is available for executing maintenance of the model patient body and the model patient body can be manufactured separately from the examination table, thereby efficiently achieving such operations like shipment, conveyance, delivery and installment. In addition, when a several kinds of model patient bodies are prepared, they may be replaceably mounted on the examination table and further the model patient body can be mounted on a different examination table. Accordingly, various medical training depending on the purpose of training can be executed.

In this case, as described in claim 16, the model patient body may have a driving system connecting portion in the model patient body driving means side, the connecting portion being connectable to at least one of a connecting portion of an electric driving system and a connecting portion of a fluid driving system provided in the examination table when coupled via the coupling means. Accordingly, the driving system of the model patient body driving means can be established together with that the model patient is coupled with and mounted on the examination table by the coupling means, thereby being very rational.

Further, as described in claim 17, the examination table may have a sitting seat movable up and down, a tiltable back seat connected to the rear end of the sitting seat, and a tiltable headrest connected to the upper end of the back seat; the model patient body has a head portion, a trunk portion including a hip portion and a back portion, and a leg portion including a crural area; and the coupling means is provided either between the trunk portion of the model patient body and the sitting seat or the back seat of the examination table, between the sitting seat and the crural area of the model patient body, or between the headrest of the examination table and the head portion of the model patient body. Therefore, the coupling portion is hidden by the above-mentioned each component of the model patient body, so that the model patient body does not give a sense of discomfort and seems to be integrated with the examination table.

According to the medical training apparatus described in claim 18, a model patient body control/operation means for controlling the model patient body driving means is provided on or at the vicinity of the examination table; and the model patient body control/operation means has a connecting portion for an electric driving system or a connecting portion for a fluid driving system; and the model patient body has a connecting portion for the driving system at the model patient body driving means side detachably connecting with at least more than one of the connecting portions. Therefore, the driving system of the model patient body driving means for driving each portion of the model patient body on the examination table can be easily established only by connecting both connecting portions. In this case, the model patient body may be simply placed on the examination table or may be integrated with the examination table, and in addition it may be detachable via the coupling means.

According to the medical training apparatus described in claim 19, a system stop switch for urgently stopping an operating portion of the examination table and the model patient body is further provided. Therefore, when at least one of the examination table and the model patient body is malfunctioned during training operation, sudden accident of the trainee can be prevented in advance by operating the system stop switch. In this case, as mentioned in claim 20, if the system stop switch is designed to be provided for the examination table, the trainee can easily operate the switch by himself, thereby being more useful.

According to the medical training apparatus described in claim 21, an operating medium of the model patient body driving means includes fluid such as gas and liquid; and an operation switch for releasing the model patient body in order to urgently remove a part of or all of the operating pressure of the fluid during operation is further provided. Therefore, when the model patient body is malfunctioned during training operation, such operating pressure can be removed by operating the model patient body releasing operation switch, so that the medical instrument of the trainee is prevented in advance from being pinched by the model patient body during training. In this case, as mentioned in claim 22, if the operation switch for releasing the model patient body is provided for the model patient body or the examination table, the trainee can easily operate the switch by himself, thereby being more useful.

BRIEF DESCRIPTION OF DRAWINGS

FIG. 18a shows that the model patient body receives medical treatment and FIG. 18b and FIG. 18c show its facial expression (painful expression and vomiting expression).

FIGS. 22a, 22b and 22c show other embodiment of the mounting relation of the model patient body and the treatment table and the connecting relation of a driving operation medium for a model patient body driving means, wherein FIG. 22a is a conceptual side view of the model patient body, FIG. 22b is the conceptual front view when the model patient body is coupled with the treatment table, and FIG. 22c shows the conceptual flat view of the essential part of the treatment table.

FIGS. 24a, 24b and 24c are conceptual views showing the coupling relation of the model patient body and the treatment table, wherein FIG. 24a is a conceptual side view of the model patient body, FIG. 24b is a conceptual side view of the treatment table, and FIG. 24c is a conceptual front view when the model patient body is placed and coupled on the treatment table.

BEST MODE FOR CARRYING OUT THE INVENTION

Figure 1:
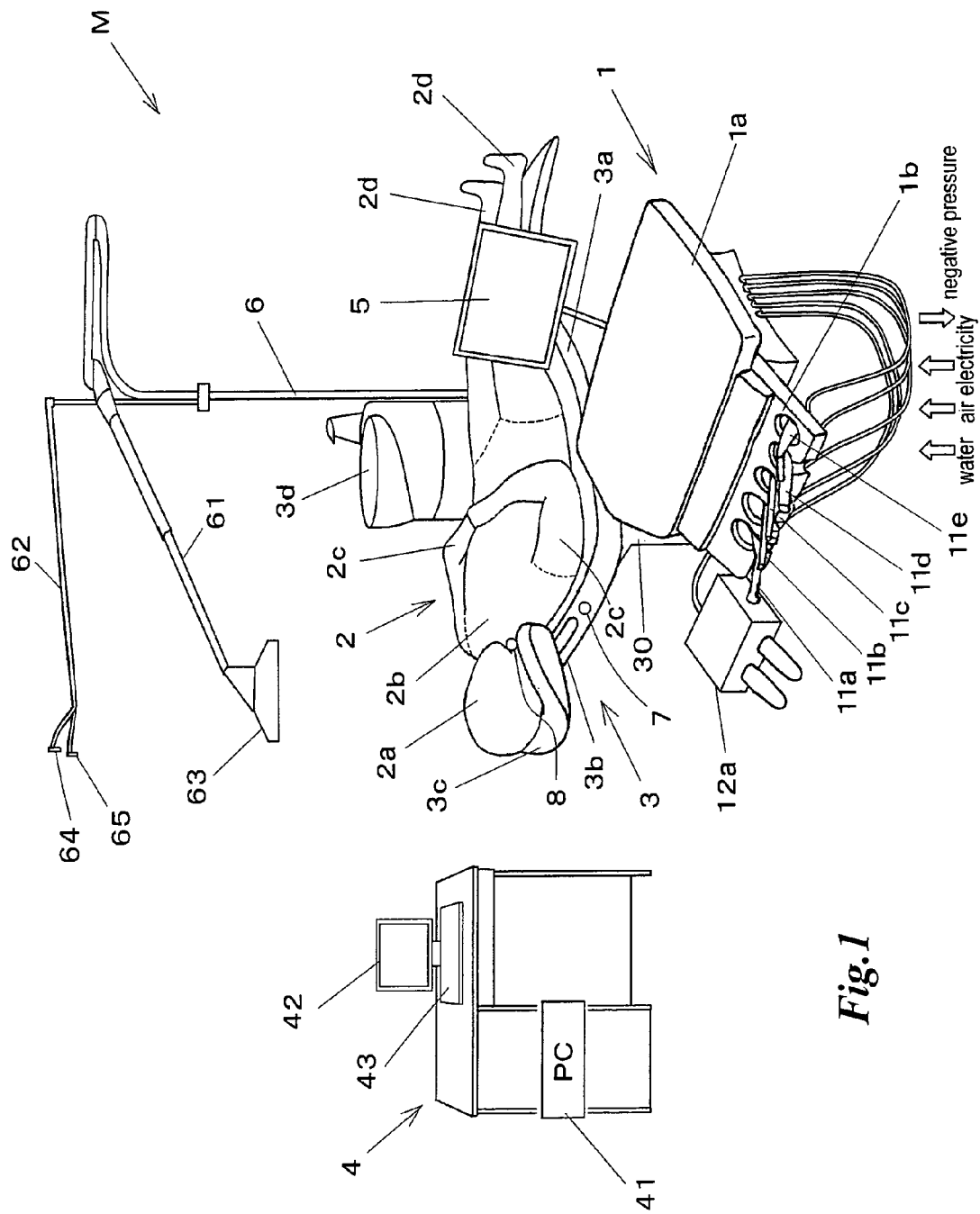
FIG. 1 is a perspective view showing the entire structure of the medical training apparatus of the present invention.

Now the preferred embodiments of the medical training apparatus according to the present invention are explained referring to the drawings.

FIG. 1 is a perspective view showing the entire structure of the medical training apparatus of the present invention. The medical training apparatus M comprises as shown in FIG. 1 an instrument table 1 having medical instruments 11a-11e, a model patient body 2 simulating a patient subject to medical treatment or examination, an examination table 3 for executing medical treatment on which the model patient body 2 is placed, and an information processing unit 4 for displaying several kinds of information as GUI and for receiving several kinds of orders for the model patient body 2.

The instrument table 1 has an instrument holder 1b in front of a table 1a which is pivotably fitted to the examination table 3 via an arm and the medical instruments 11a-11e such as cutting tools like an air turbine handpiece and a micro motor handpiece, a scaler, a three-way syringe, a vacuum syringe are detachably provided for the instrument holder 1b, and a display (display means) 5 is provided above the table 1a so as to call up and display a patient's carte and to monitor the operating condition of the medical instrument during training.

Figure 2:
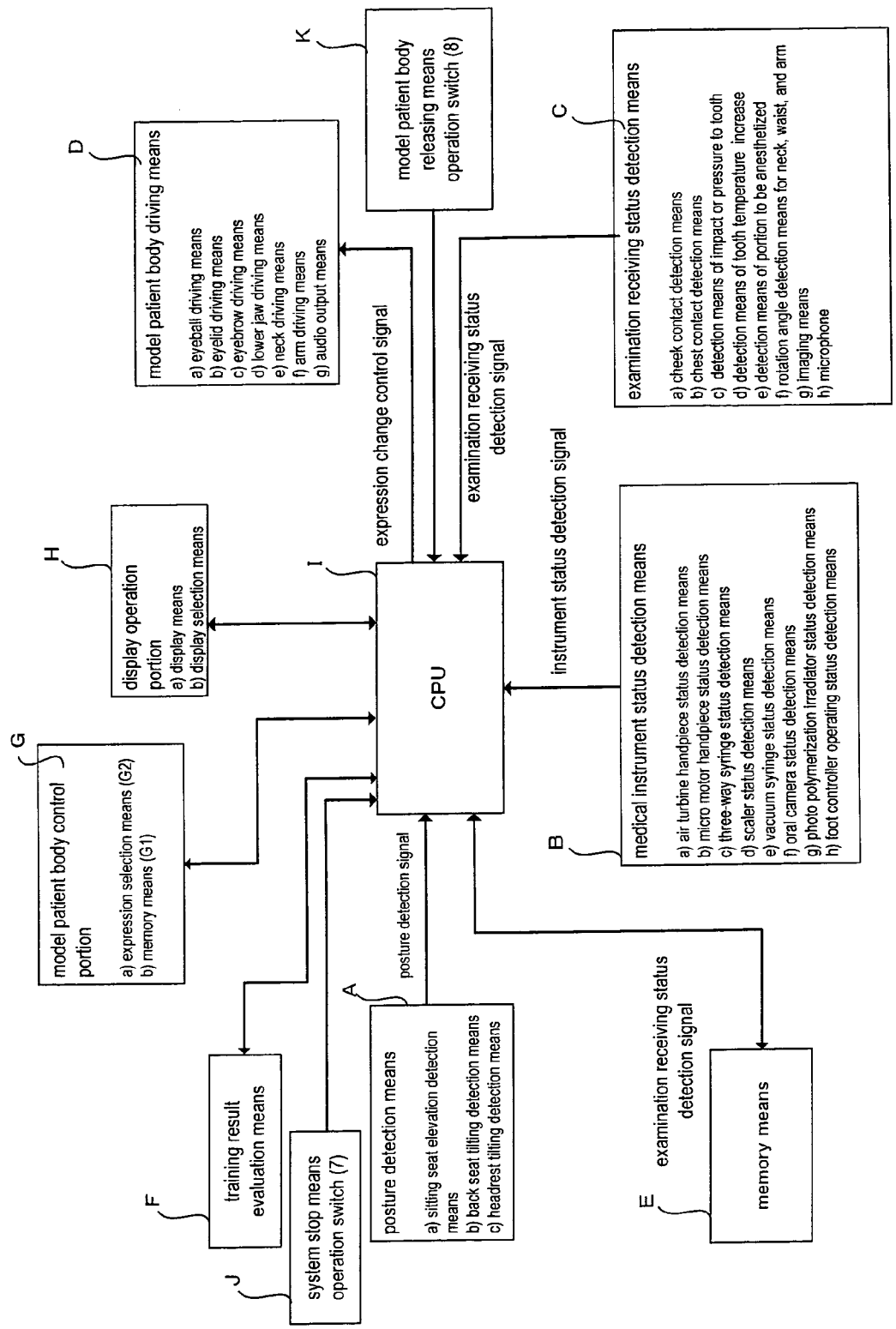
FIG. 2 is a block diagram showing the function achieving means of the present invention.

A medical instrument driving means is constructed by combining an oral camera, a photo polymerization irradiator (both of them are not shown), and a foot controller 12a into these medical instruments 11a-11e and further a medical instrument status detection means B is provided for detecting their working status (refer to a functional block diagram in FIG. 2). The medical instrument driving means turns on or off the medical instruments 11a-11e and the medical instrument status detection means B detects each medical instrument 11a-11e is taken up by providing a sensor for the instrument holder 1b and detects on-off of the usage condition by detecting the operation of the foot controller 12a. However, if an operation means is provided for the medical instruments 11a-11e themselves, a sensor for detecting operation of the operation means may be provided. The instrument holder 1b may include one provided for the examination table 3 as long as it can detachably provide medical instruments 11a-11e, other than the instrument holder 1b shown in the figure.

On the other hand, the medical instrument status detection means B detects the voltage number, the voltage value corresponding to the revolution number, the current value of the medical instruments 11a-11e, the air pressure, the air flow amount, the frequency, the vibration number when the medical instruments 11a-11e are operated, the pressing force when the medical instruments 11a-11e contact the model patient body 2, or the operation signal of the foot controller 12a connected to the examination table 3. The medical instruments 11a-11e are connected with a water supply source, an air supply source or an air suction means, however, their explanation is omitted here because they are well known.

The model patient body 2 comprises a head model 2a, a trunk model 2b, right and left arm models 2c and right and left leg models 2d. These models include a model patient body driving means D for changing the posture and facial or body expression of the model patient body 2 as mentioned later and an examination receiving status detection means C for detecting the situation of the model patient body 2 under medical treatment or examination (see the functional block diagram in FIG. 2) and the model patient body 2 wears a hairpiece as head hair and an artificial skin.

Such a model patient body 2 is not a prior one of which anatomy is mechanically formed, but an android type robot which wears an artificial skin and an artificial hair and is extremely resemble a human body. It is placed on the examination table 3 and several kinds of treatment can be made like a human being and is connected to driving sources for supplying mechanical, electric or fluidic energy (operating medium) for changing the posture or the facial or body expression as mentioned later. The model patient body 2 may work integrally with the examination table 3 or in synchronization with it, or otherwise may independently work. The detail of the model patient body 2 is described later.

Figure 3:
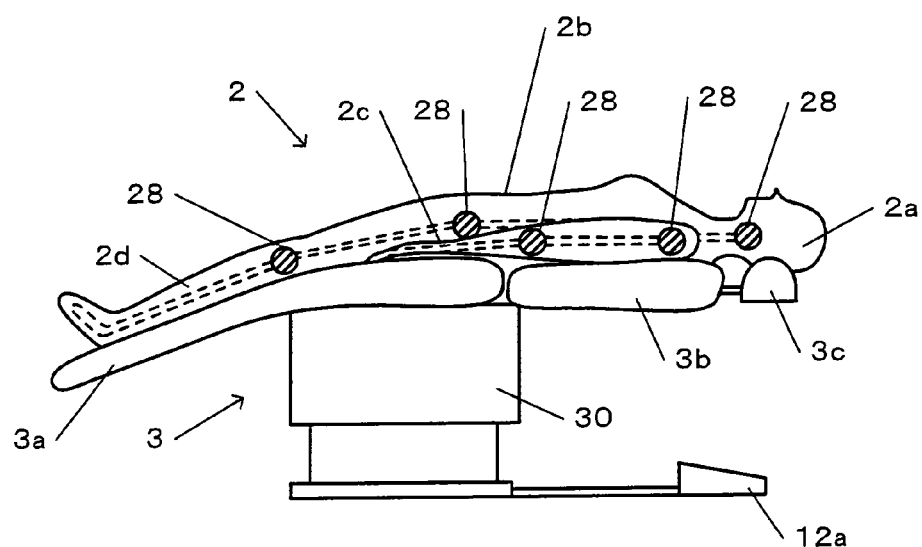
FIG. 3 shows the structure of the joint portions of the model patient body.

As shown in FIG. 3, the examination table 3 has a sitting seat 3a placed on a base 30 movable up and down, a tiltable back seat 3b and connected at the rear end of the sitting seat 3a, and a tiltable headrest 3c and connected at the upper end of the back seat 3b. It is provided with a sitting seat elevating means for controlling them at an appropriate position depending on the examination status, a back seat tilting means, and a headrest tilting means (those of them are not shown) so as to be controlled by the foot controller 12a. Such a sitting seat elevating means and a back seat tilting means use a prior hydraulic cylinder and electric motor and so on and the headrest tilting means uses an electric motor and the like.

A treatment stand pole 6 is attached to the examination table 3 and arms 61, 62 are diverged and rotatably projected from the stand pole 6. These arms have a shadowless lamp 63, and an imaging camera 64 having an imaging means for taking pictures of the trainee's handling of the medical instruments 11a-11e and the movement, the change of the posture, movement and expression of the model patient body 2, and a microphone 65 for collecting the sound during medical treatment. The reference numeral 3d shows a spittoon unit which has a hydrant for supplying water for rinsing a mouth and a spittoon.

The information processing unit 4 comprises a workstation such as a PC 41, a display means 42 like a liquid crystal monitor, and an operation means 43 like a keyboard and a mouse, and several kinds of information are shown on the display means 42 and several kinds of orders are received by the operation means 43 like a keyboard and a mouse. The display means 42 shows the examination receiving status of the model patient body 2 during training and necessary information is called out and displayed, and in addition, the PC 41 includes a specific program so that the display means can be also operated as a model patient body control and operation means (shown as the reference character G in FIG. 2) by operating the program and an expression selection button as an expression selection means G2 mentioned later is displayed on the display means 42. Accordingly, a trainer can control the movement and expression of the model patient body 2 by selecting and operating the expression selection button while understanding the trainee's condition. Further, as mentioned later, several kinds of sensors S housed in each part of the model patient body 2 can be called up by operating a sensor selection button shown on the display means 42 and the detection signal can be displayed on the monitor.

A system stop switch 7 constituting a system stop means J, mentioned later, is provided at the shoulder portion of the back seat 3b. The system stop switch 7 is an emergency stop switch for bringing down the whole system (the model patient body 2, the examination table 3 and the medical instruments 11a-11e) when at least one of the model patient body 2 and the examination 3 is malfunctioned. The system stop switch 7 is preferably provided for the shoulder portion of the back seat 3b because the trainee easily operates, however, it may be appropriately provided around the instrument table 1 or the headrest 3c considering the accessibility of the trainee. The object to be stopped is preferably the whole system, however, if at least the model patient body 2 and the examination table 3 is stopped, the safety can be kept.

A model patient body releasing switch constituting a model patient body release means K, mentioned later, is provided at the neck portion of the model patient body 2 (see FIG. 6). The model patient body releasing switch 8 is to be operated for releasing the entire or a part of the force applied to the model patient body 2, which is the operation pressure (air pressure and liquid pressure) of the operating medium (air, water, oil) for driving the model patient body driving means D. An open valve (not shown) is provided along the driving system (piping system) of the operating medium and is opened by operating the model patient body releasing switch 8 to discharge the operating medium out of the system. The model patient body releasing switch 8 is preferably provided at the neck portion of the model patient body 2 in view of the accessibility of the trainee, however it may be appropriately provided at the temporal part of the model patient body 2 or around the instrument table 1 or the headrest 3c considering the accessibility of the trainee. Otherwise, the model patient body 2 may be also released after stopping the system by serving the system stopping switch 7 as the releasing switch. Further, as mentioned later, the operation signal of the system stop means J and the model patient body release means K are input into a control means (CPU) I in FIG. 2, however, they may be directly input to the model patient body driving means D.

FIG. 2 shows the functional block diagram of the medical training system M of the present invention. As shown in the figure, each functional block A-H, J, K is designed to be controlled by the control means (CPU) I shown at the center. The control means I and each function achieving means A-H, J, K are directly connected by a signal line or a hospital LAN.

The reference character A indicates a posture detection means and comprises a combination of a) a sitting seat elevation detection means, b) a back seat tilt detection means, and c) a headrest tilt detection means and detects the control condition of the examination table 3 during examination. For example, each detection means has an angle detection sensor and a potentiometer to detect the elevating amount, the tilting amount, the tilting angle, on-and-off, and the like.

The reference character B indicates a medical instrument status detection means and detects the operating status during training of each medical instrument 11a-11e driven by, the above-mentioned medical instrument driving means, the oral camera, the photo polymerization irradiator, and the foot controller 12a, namely on-off, the number of revolutions, and load thereof. For this purpose, the medical instrument status detection means B comprises a combination of a) an air turbine handpiece status detection means, b) a micro motor handpiece status detection means, c) a three-way syringe status detection means, d) a scaler status detection means, e) a vacuum syringe status detection means, f) an oral camera status detection means, g) a photo polymerization irradiator status detection means, and h) a foot controller operating status detection means.

The reference character C indicates an examination receiving status detection means and comprises several kinds of sensors S housed in the model patient body 2 and the imaging means 64 for imaging the examination status. Several kinds of sensors S include a) a detection means of contact with the cheek of the model patient body 2, b) a detection means of contact with the chest, c) a detection means of the impact or pressure to the tooth, d) a detection means of the increased temperature of the tooth, e) a detection means of a portion to be anesthetized, f) a detection means of the rotation angle of the neck, the waist, and the arm, g) an imaging means, h) a microphone and the like, as mentioned later. The existence or the degree of stimulation applied on the model patient body 2 by the treatment or examination during training is understood by the sensors S, the imaging means and the microphone and is output as the examination receiving status detection signal.

The reference character D indicates a model patient body driving means and comprises a combination of a) an eyeball driving means, b) an eyelids driving means, c) an eyebrow driving means, d) a lower jaw driving means, e) a neck driving means, f) an arm driving means, g) a sound output means and the like and they are incorporated in the face or in the body of the model patient body 2 closely resembling a human body, as mentioned later, thereby realizing the facial expression or body movement of the model patient body 2 by combining these driving.

The reference character E is a memory means for storing the examination receiving status detection signal output from the examination receiving status detection means C and the evaluation standard information to be used in a training result evaluation means.

The reference character F is the training result evaluation means for comparing the evaluation standard stored in the memory means E in advance with the medical instrument status detection signal detected by the medical instrument status detection means B and/or the examination receiving status detection result detected by the examination receiving status detection means C after the trainee's examining operation is completed, outputs the training evaluation result based on a predetermined algorithm, and rates the results depending on the ability of the trainee or shows an inappropriate examination items depending on the result on the display 42 of the information processing unit 4 or the display 5 of the instrument table 1.

The model patient body control/operation unit G has a memory means G1 for storing the movement of the model patient body driving means D incorporated in the model patient body 2 corresponding to the change of the body's posture and expression and an expression selection means G2 for selecting the expression change stored in the memory means G1. The expression selection means G2 has an expression selection button so as to reproduce the expression change of the model patient body 2, for example, vomiting, painful, uneasy, relaxed, discomfort. Providing such a model patient body control/operation unit G, the expression of the model patient body 2 can be controlled by operating the display selection button when the trainer judges the trainee's condition, as mentioned later, in addition to the original control movement in which the trainee's treatment act is automatically reflected on the expression and movement of the model patient body 2.

The reference character H indicates a display/operation portion and comprises a combination of a) a display means and b) a display selection means. The display means is constructed with a display means 42 provided for the information processing unit 4 and the display selection means is constructed with a selection button 42d(#1-6) for selecting the output of each sensor of the examination receiving status detection means C by means of a mouse and the like (see FIG. 19).

The reference character J indicates a system stop means and comprises the system stop switch 7, as mentioned above. The operation signal of the system stop switch 7 is input to the control means I which executes stop control of the system based on the input signal.

The reference character K indicates a model patient body releasing means and comprises the model patient body releasing switch 8 as mentioned above. The operation signal of the model patient body releasing switch 8 is input to the control means I which controls to release the entire force or a partial force applied on the model patient body 2 by the operating medium for driving the model patient body driving means D based on the input signal.

The medical training apparatus M of the present invention has the posture detection means A for detecting the posture of the examination table 3, the posture detection means A comprising the instrument holder 1b having medical instruments 11a-11e, the model patient body 2 simulating a patient to be examined, and the examination table 3 on which the model patient body 2 is placed, the medical instrument status detection means B for detecting the working status of the medical instruments 11a-11e, the examination receiving status detection means C for detecting the situation of the model patient body 2 under medical treatment or examination, and the model patient body driving means D housed in the model patient body 2. The model patient body driving means D is characterized in that the expression of the model patient body 2 is changed based on at least one of the posture detection signal output from the posture detection means A and the medical instrument status detection signal output from the medical instrument status detection means B, and the examination receiving status detection signal output from the examination receiving status detection means C.

Therefore, the expression of the model patient body 2 may be changed based on the posture detection signal and the examination receiving status detection signal, it may be changed based on the medical instrument status detection signal and the examination receiving status detection signal, or it may be changed based on the posture detection signal, the medical instrument status detection signal, and the examination detection signal.

Figure 4:
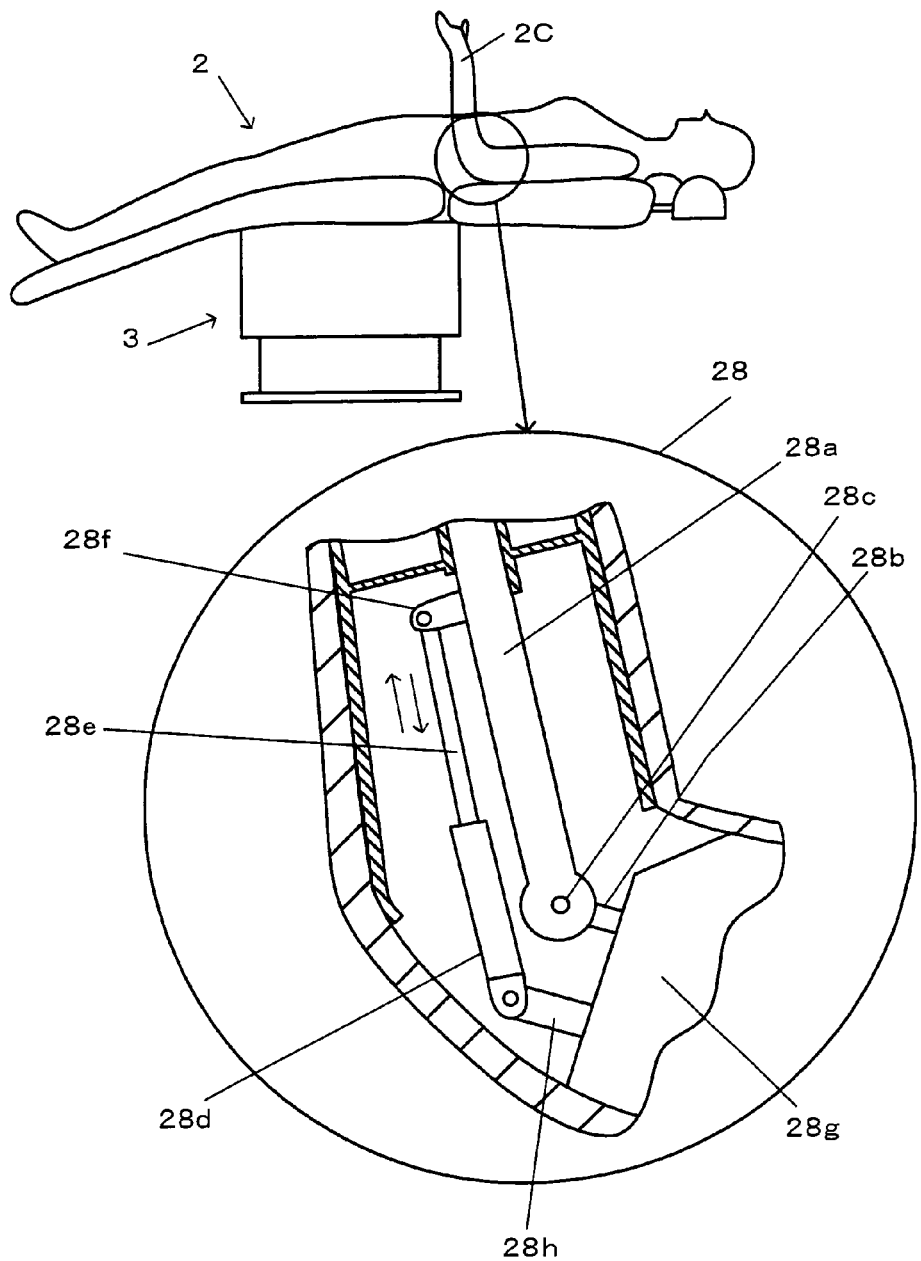
FIG. 4 shows details of the articulated mechanism.

Next, each portion constituting the present invention is explained in detail FIG. 3 and FIG. 4 show the model patient body.

As shown in FIG. 3, the model patient body 2 comprises a head model 2a, a trunk model 2b, right and left arm models 2c, and right and left leg models 2d. An articulated mechanism 28 is provided between the head model 2a and the trunk model 2b, between the trunk model 2b and the right and left leg models 2c, between the trunk model 2b and the right and left leg models 2d, at elbow of the right and left arm models 2c, and at genicula of the right and left leg models 2d so as to be able to be bent to perform like the arthro of a human body.

FIG. 4 shows a detailed embodiment of the articulated mechanism 28, in which an air cylinder 28d is attached to two main rods 28a, 28b which are pivotally provided each other for constituting the anatomy, a rod 28e provided at one end of the air cylinder 28d is fixed to a projecting portion 28f formed on the main rod 28a, and the other end of the air cylinder 28d is pivotally provided for a small rod 28h projected from a member 28g fixing the main rod 28d, thereby being capable of freely inflecting with two main rods 28a, 28b by reciprocating the rod 28e of the air cylinder 28d.

FIG. 4 shows a detailed construction of the elbow of the arm model 2c in which the elbow can be stretched and flexed by elongating the rod 28e of the air cylinder 28d and other articulated mechanism 28 is similarly constructed.

The articulated mechanism 28 of the waist and the knee may be designed so as to passively move according to the positional change of the examination table 3 when the air cylinder 28d is not driven.

Figure 5:
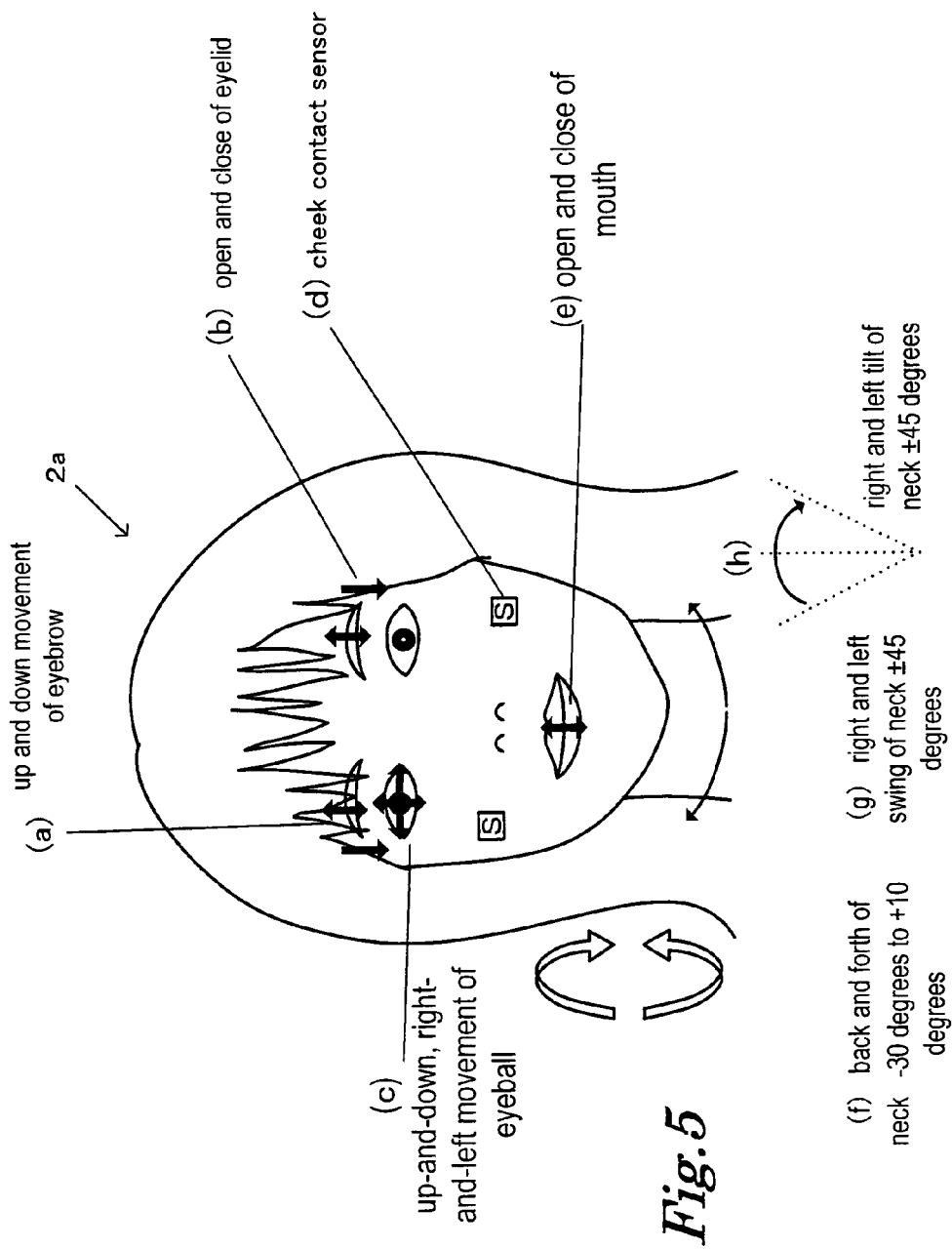
FIG. 5 shows the facial expression of the model patient body.

FIG. 5-FIG. 9 show a head model of the model patient body. FIG. 5 shows the front view of the face of the head model and its movement, and the head model is covered with an artificial skin on its face and is covered with a hairpiece as hair.

The model patient body 2 is provided with an audio output means for outputting sound other than driving means for driving each part of the face, namely eyeballs, eyelids, eyebrows, cheeks, mouth, lips, and neck, thereby showing facial expressions similar to a human being by driving these model patient body driving means D.

The embodiment in FIG. 5 shows a) the eyebrows move up and down, b) the eyelids open and close, c) the eyeballs move up-and-down, and right-and-left, d) the mouth opens and closes, in addition, e) a contact sensor is housed in cheeks, and as to the neck, like a human being, f) it bends back and forth, g) it swings right and left, and h) it tilts right and left. The detection signal of the contact sensor S provided for the cheek as mentioned in e) is sent to the examination receiving status detection means C.

Figure 6:
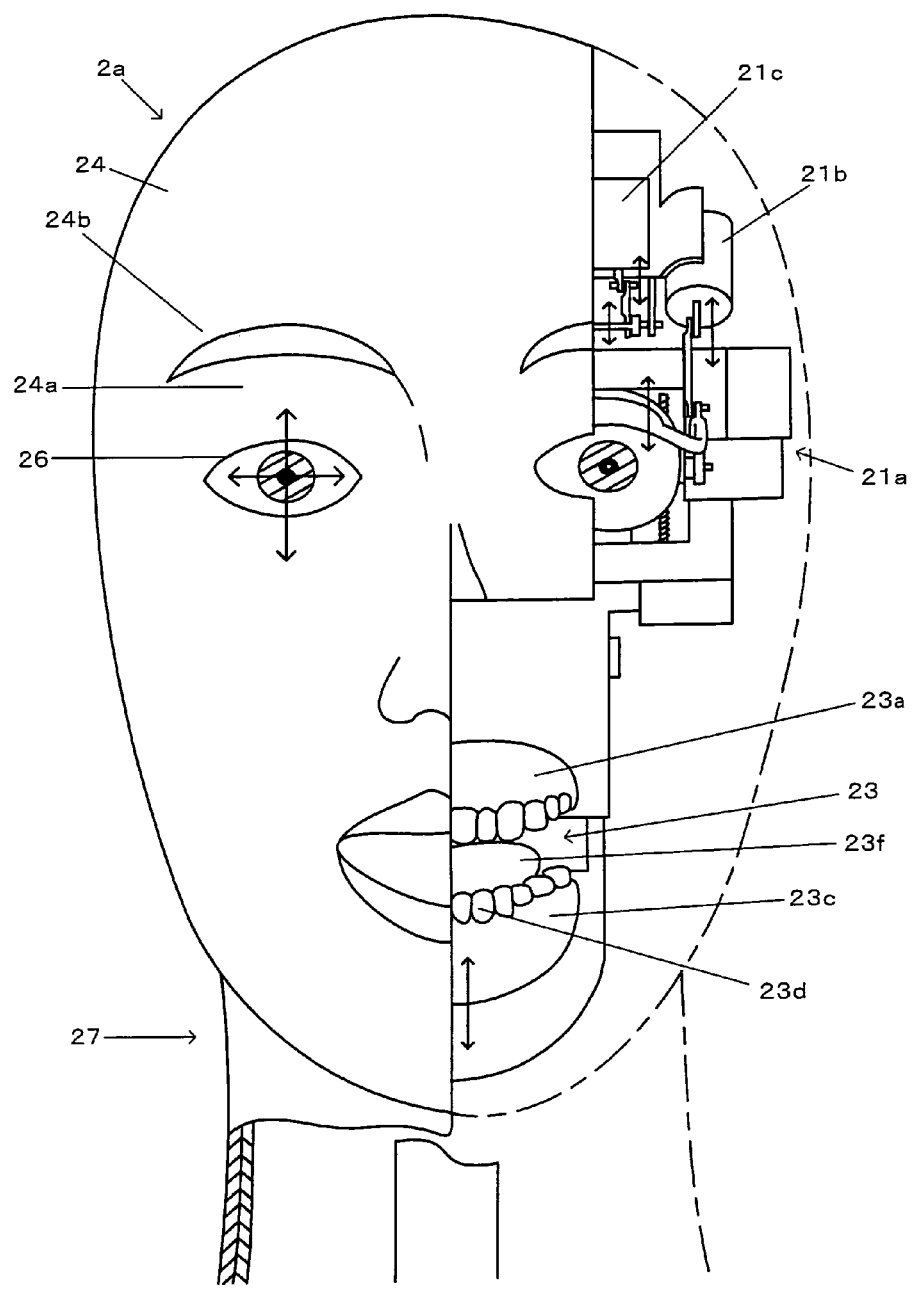
FIG. 6 is a front view of the face of the model patient body showing the internal structure by breaking the essential part.
Figure 7:
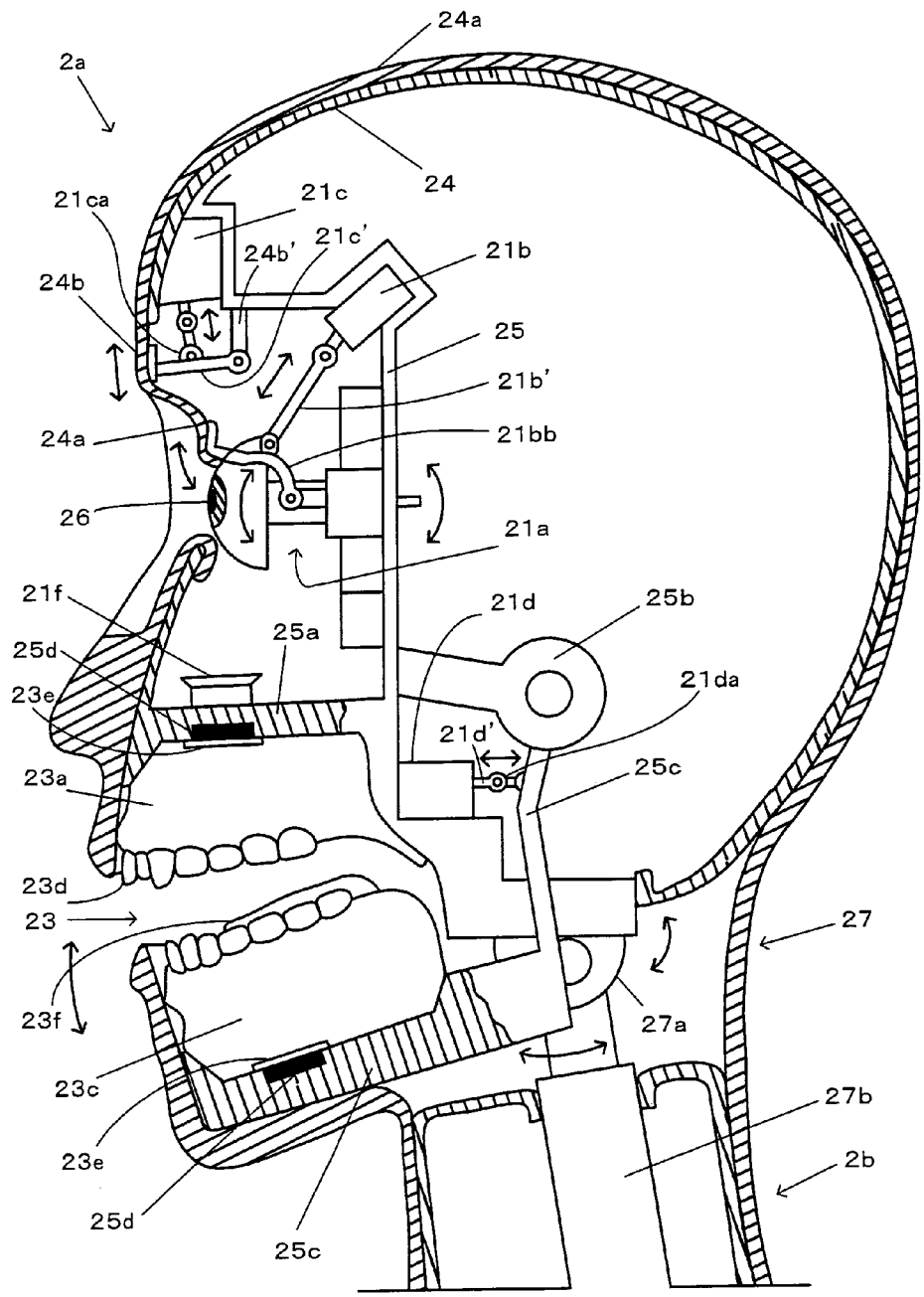
FIG. 7 shows a vertical sectional structure of the head of the model patient body.

The internal structure of the head model is further explained referring to FIG. 6 and FIG. 7. In FIG. 6 the substantial part of the left of the head model is cut away and FIG. 7 diagrammatically shows the vertical sectional structure. The head model 2a is constructed such that a cranial bone member 24 formed with a hard resin is covered with a skin member 24a formed with a silicon rubber which is soft like skin and the surface of the skin member 24a is appropriately colored and processed. A frame 25 made of a rigid member is incorporated in the cranial bone member 24.

The frame 25 is constructed such that an upper jaw bone member 25a and a lower jaw bone member 25c are coupled with a jaw joint portion 25b, further an air cylinder 21d is provided, and the lower jaw bone member 25c opens downwardly while turning relative to the jaw joint portion 25b when the rod 21d' is extended. In the contrary, when the rod 21d' is contracted, the lower jaw bone member 25c is upwardly operated to be closed while turning relative to the jaw joint portion 25b. The frame 25 comprises an eyeball driving means 21a having a model eyeball 26, an eyelid driving means 21b and an eyebrow driving means 21c. These driving means constitute the model patient body driving means D.

The eyelid 24 has a member 21bb with its one end rotatably fixed to the frame 25 and the member 21bb is moved up and down before the model eyeball 26 by reciprocating a rod 21b' of the air cylinder (eyelid driving means) 21b to open and close the eyelid 24b.

The eyebrow driving means 21c is constructed such that a rod 21c' of the air cylinder (eyebrow driving means) 21c is fixed to a member 21cb pivotally fitted to a projecting piece 21ca projected from the frame 25 and a movable member 24c provided at a portion corresponding to the eyebrow of the artificial skin is moved up and down by reciprocating the rod 21c', thereby moving the eyebrow up and down. The movement of the eyeball driving means is explained later.

The neck 27 has a joint mechanism 27a coupling the head model 2a and the trunk model 2b so as to be able to be tilt back-and-forth and right-and-left and the rod downwardly extending from the joint mechanism 27a is rotatably housed in a sheath portion 27b. Accordingly, the neck can tilt back and forth from +10 degrees to −30 degrees and right and left within the range of +45 degrees by the joint mechanism and it can turn right and left within the range of ±45 degrees by turning the rod in the sheath 27b. The contact sensor for detecting careless contact of the operator during examination is housed in the right and left cheeks (see FIG. 5d). The model patient body releasing switch 8 is provided on the surface of the right skin member 24a covering the joint mechanism 27a of the neck 27 as shown in FIG. 6.

The reference numeral 23 indicates a jaw model and comprises the combination of an upper jaw model 23a and a lower jaw model 23c. Each jaw model has a steel piece 23e so as to be detachable to a magnet 25d provided for the opposing upper jaw bone member and low jaw model member. A tooth 23d is planted on the upper jaw model 23a and the lower jaw model 23c so as to be exchangeable one by one. Accordingly, the tooth which is worn at the time of cutting training can be exchanged or the tooth can be exchanged with a specific tooth with caries or dental calculus. Further the jaw model 23 can be exchanged with a small model for a child or a toothless jaw model without planting a tooth 23d. The tooth 23d may adopt a similar structure to the training tooth described in the patent document 2.

The upper jaw model 23a and the lower jaw model 23c have the following sensor S for detecting treatment and examination during training. More specifically, the sensor may include an impact sensor for detecting the impact when the medical instruments 11a-11e contact the tooth 23d, a pressure sensor for detecting the pressure applied on the tooth and the upper and lower jaws during cutting treatment, a vibration sensor for detecting the vibration, a temperature sensor for detecting the increased temperature (for example, at the time of impression taking and laser cutting), and a sensor for detecting the change of conducting value or resistance value for detecting the cutting degree of the tooth. The examination receiving status detection signal is sent to the control means I from these sensors, then the examination receiving status of the model patient body 2 during training can be objectively understood and can be used as examination data. These sensors S are assembled as the examination receiving status detection means C and output the examination detection receiving status signal to be sent to the information processing unit 4.

Figure 8:
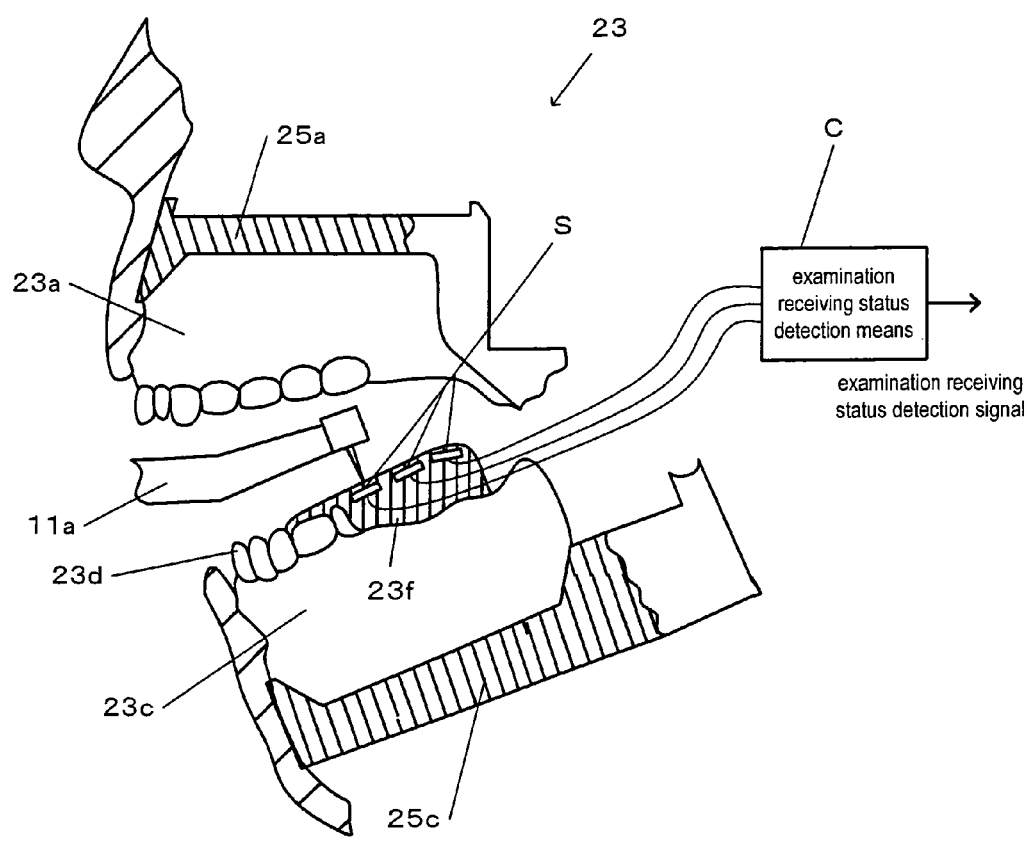
FIG. 8 shows the structure of a jaw model.

FIG. 8 shows an example of the contact sensor A housed in a tongue member 23f or in a throat member and shows the condition that the detection signal of the contact sensor S is sent to the examination receiving status detection means C to be output as the examination receiving status detection signal. When the medical instruments 11a-11e contact the deep portion of the tongue member 23f or the throat member housing the contact sensor S, the model patient body 2 can show a vomiting expression like an actual patient, as mentioned later.

Figure 9:
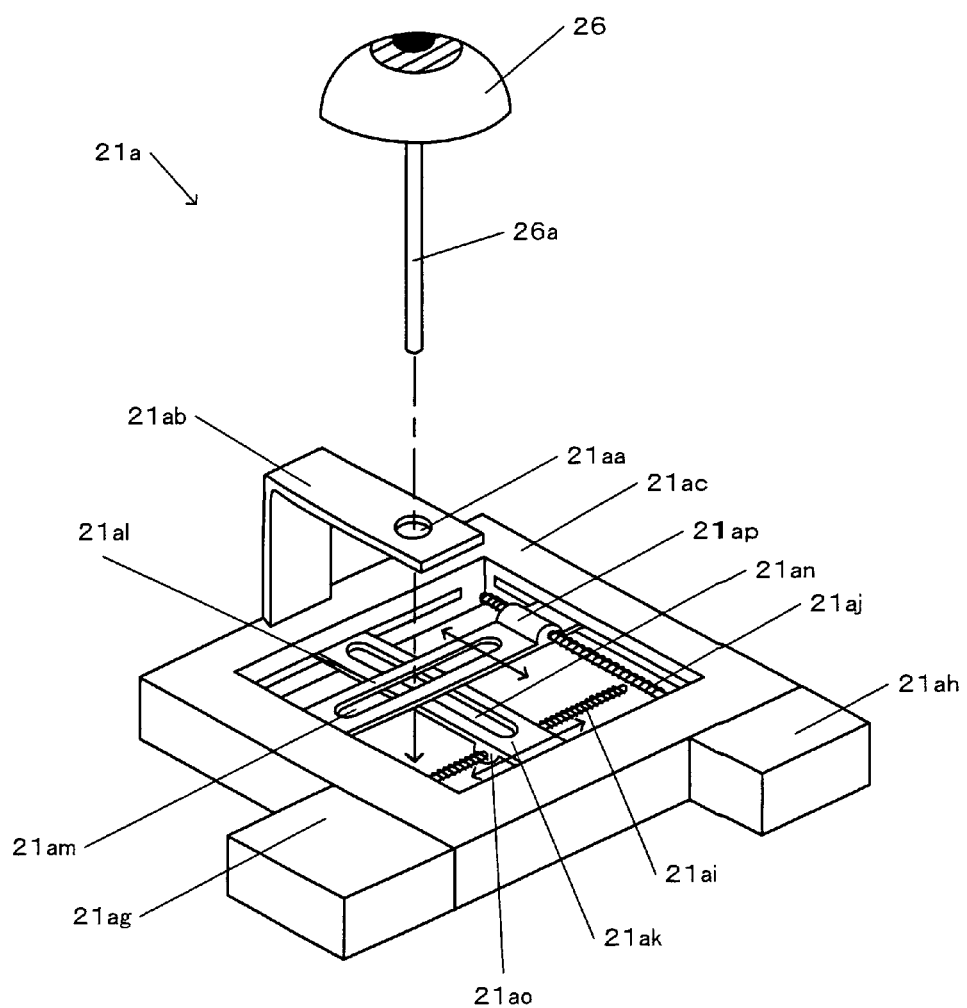
FIG. 9 is a perspective view showing an example of an eyeball driving means.

FIG. 9 is a perspective view showing an example of a model eyeball driving means 21a. The hemispherical model eyeball 26 of which center a pupil is drawn is provided with a bar like member 26*a* extending in the backward direction of the eyeball. The bar like member 26*a* is loosely fit to a hole 2*aa* formed on a supporting member 21*ab* projected above a frame body 21*ac* and is further inserted into a long holes 21*am*, 21*an* formed on two members 21*al*, 21*ak* arranged so as to cross each other at the opening portion of the frame body 21*ac* in a manner that the long holes 21*am*, 21*ak* have such a looseness not to become complicated when the member 26*a* is inclined. The members 21*al*, 21*ak* have a connecting portion 21*ao*, 21*ap* to be screwed with the screw axes 21*ai*, 21*aj* of stepping motors 21*ag*, 21*ah* attached to the frame body 21*ac*, respectively.

Accordingly, when two stepping motors 21*ag*, 21*ah* are controlled to be rotated and the two members 21*al*, 21*ak* are moved in the frame body 21*ac*, the bar like member 26*a* is moved to direct the movable model eyeball 6 into right, left, up and down around a hole 21*aa*. The model eyeball 26 can tilt at 15 degrees up and down respectively and at 30 degrees right and left respectively by such a mechanism.

Figure 10A:
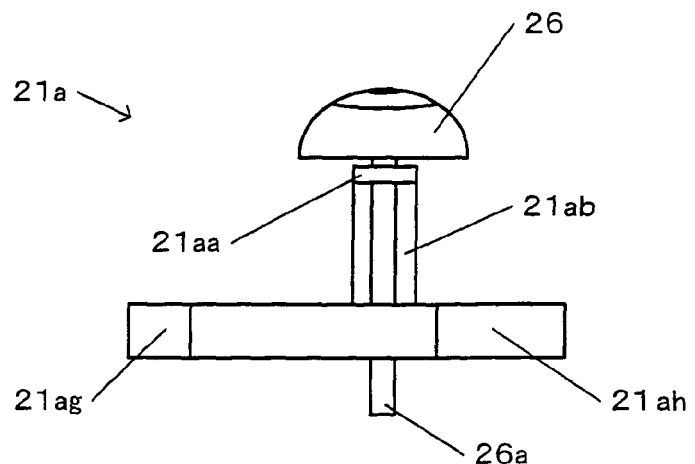
FIG. 10a shows the side structure of the eyeball driving means.
Figure 10B:
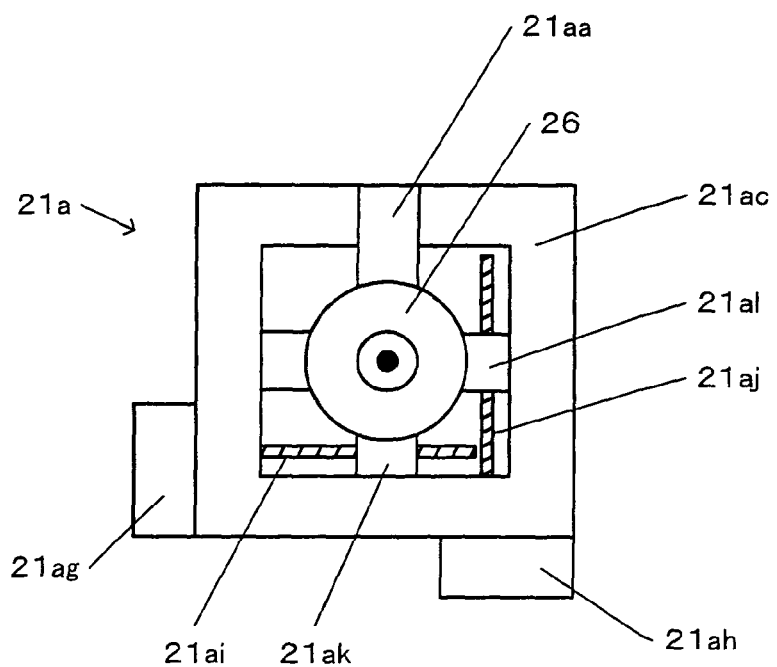
FIG. 10b shows its flat structure when an eyeball is directed to the front.
Figure 11A:
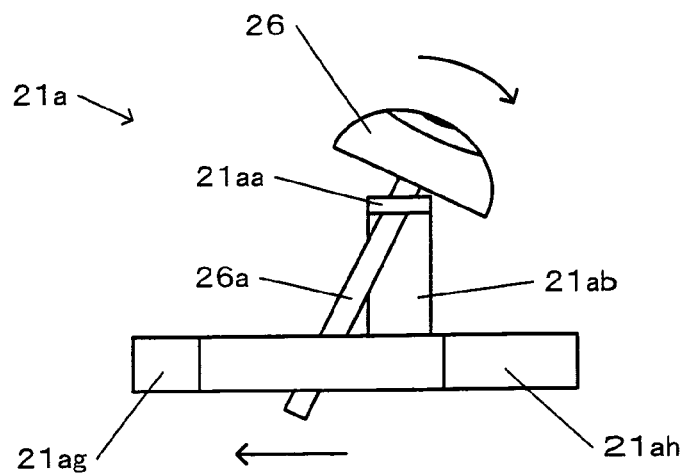
FIG. 11a shows the side structure of the eyeball driving means.
Figure 11B:
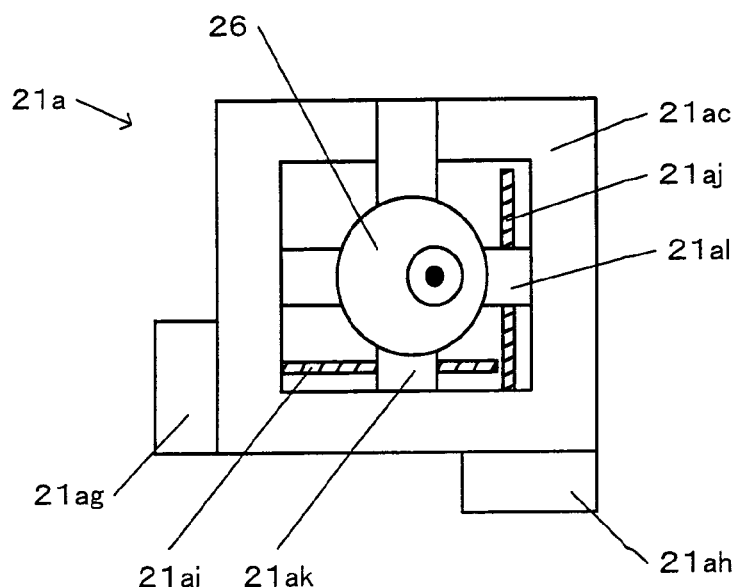
FIG. 11b shows its flat structure when an eyeball is directed to the right.
Figure 12A:
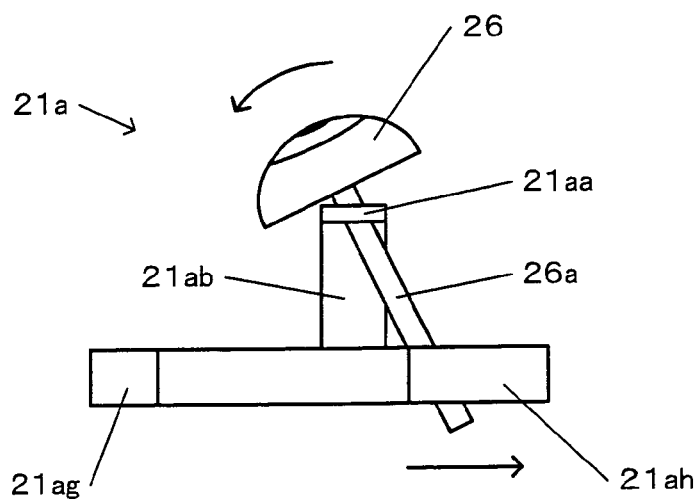
FIG. 12a shows the side structure of the eyeball driving means and FIG. 12b shows its flat structure when an eyeball is directed to the left.
Figure 12B:
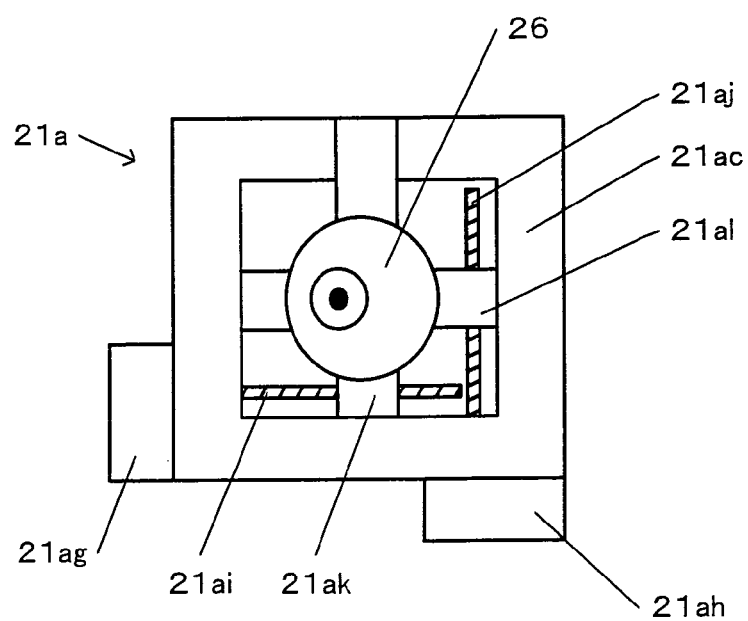

FIG. 10*a*, FIG. 10*b* diagrammatically show the side view and the plane view when the eyeball faces front. FIG. 11*a*, FIG. 11*b*, FIG. 12*a*, and FIG. 12*b* show the side view and the plane view when the eyeball is directed to the right or the left.

Figure 13:
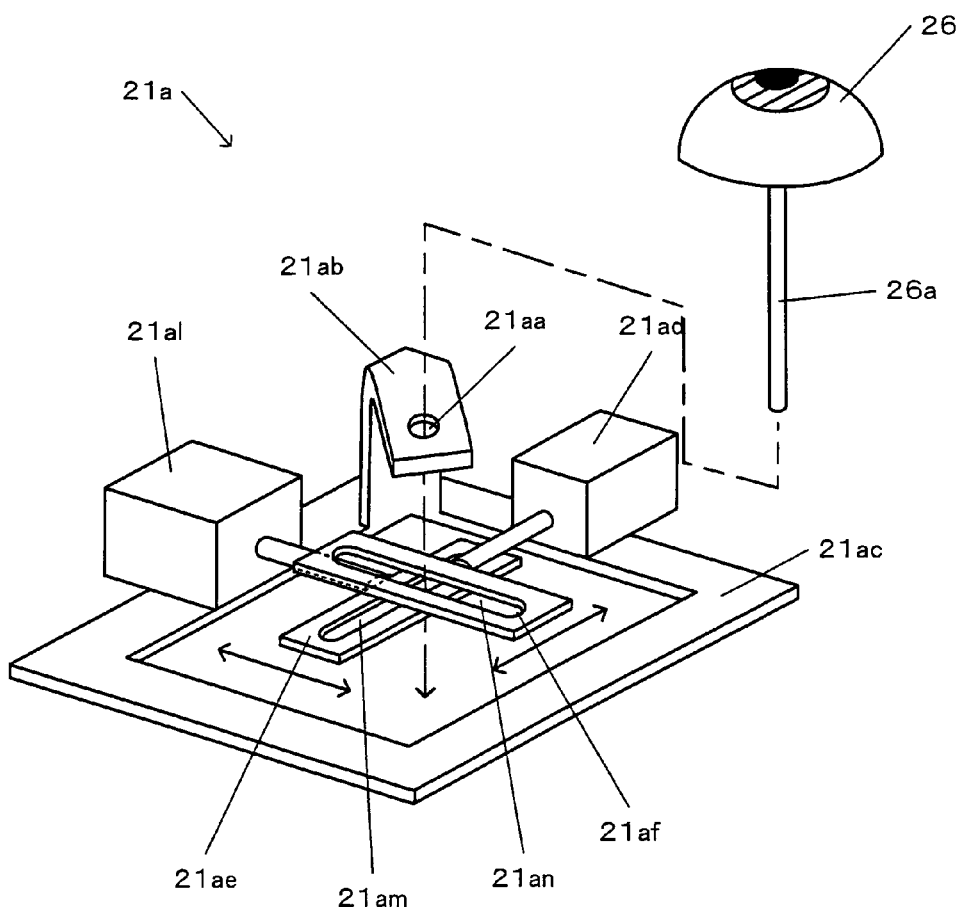
FIG. 13 is a perspective view showing other embodiment of an eyeball driving means.

FIG. 13 is a perspective view showing another example of the model eyeball driving means 21*a*. It is different from FIG. 10 in that two air cylinders 21*aq*, 21*ad* are used instead of the stepping motors, members 21*ae*, 21*af* with a long hole 21*am*, 21*an* are provided at each tip end of the rod, and the members 21*ae*, 21*af* are crossed in the frame body 21*ac*. When the overlapped position of the long holes 21*am*, 21*an* formed on each member 21*ae*, 21*ag* in the frame body 21*ac* is changed, the bar like member 26*a* of the model eyeball 26 which is inserted into the overlapped position thereof is designed to be movable back-and-forth, and right-and-left.

Sensors S for detecting contact a chest, detecting a part to be anaesthetized, detecting the angle of the articulated mechanism 28 like a neck, a waist, and an arm are provided to constitute the examination receiving status detection means C and the examination receiving status detection signal is sent to the control means I.

More specifically, the contact detection means at the cheek comprises, for example, a contact sensor S or a pressure sensor S provided under the skin member at both cheeks of the model patient body 2, as shown in FIG. 5 and detects as unpleasant medical treatment when the trainee rests his hands on the cheek when he operates the medical instruments 11*a*-11*e*.

The contact detection means at the chest comprises, for example, a contact sensor S or a pressure sensor S (not shown) provided for the chest of the model patient body 2 and detects as unpleasant medical treatment when the trainee touches the chest. Specifically a female patient feels unpleasant when the trainee touches her chest, so that such an unpleasant medical treatment is detected and makes the model patient body show the expression of unpleasant feeling.

The detection means for a portion to be anaesthetized comprises, for example, a contact sensor S (not shown) housed in the jaw models 23*a*, 23*c* and is designed to detect whether an injection is executed on a specific region determined by the medical standpoint or not, or whether the injection way of the needle is proper or not. Otherwise, the detection means may be the one provided for the apparatus described in the patent document 2 like a dental training simulation apparatus for detecting the cutting condition of a training tooth or a dental training simulation apparatus for detecting an executing position of the injection for anesthesia.

When the above-mentioned model patient body drive means D is constituted with an air cylinder, a driving air is supplied from a compressor and the like (not shown), however, it may be driven by an electric motor and a driving system is not limited. The reference numeral 21*f* in FIG. 7 is an audio output means and is constructed by incorporating a small size speaker in the head portion of the model patient body 2, in which voice to be output is stored in advance in the memory means E and the voice corresponding to the situation and further respiratory breath and the like are output as voice in response to the condition of the examination receiving status detection means C and the medical instrument status detection means B and the excitement detected by the above-mentioned sensors S during examination (for example, "Ouch!" when feeing pain during examination, or the words of thanks when the examination is finished.) Or for simplification, only a beep sound may be generated for showing discomfort and the like. An air-bag may be housed in the chest part of the trunk model 2*b* of the model patient body 2 so as to move the chest up and down by taking up one end of the air-bag in conjunction with the breathing movement by an air cylinder or the breathing movement may be changed in conjunction with the change of expression.

The impact detection means or the pressure detection means of tooth may be constituted such that a contact sensor S, an impact sensor S, or a pressure sensor S may be provided inside or at the bottom of the tooth 23*d*. Accordingly, such improper examining operation that the medical instruments 11*a*-11*e* hit against a tooth 23*d*, unnecessary force is applied or impact is applied during cutting treatment can be detected.

The means for detecting increased temperature of tooth comprises, for example a temperature sensor S housed in a tooth 23*d* and detects such an unpleasant examining operation that a hot impression material is pushed on the tooth 23*d* in case of impression taking.

Figure 14:
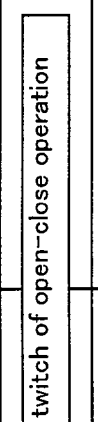
FIG. 14 is a table listing the movement of each part of the model patient body.
Figure 15A:
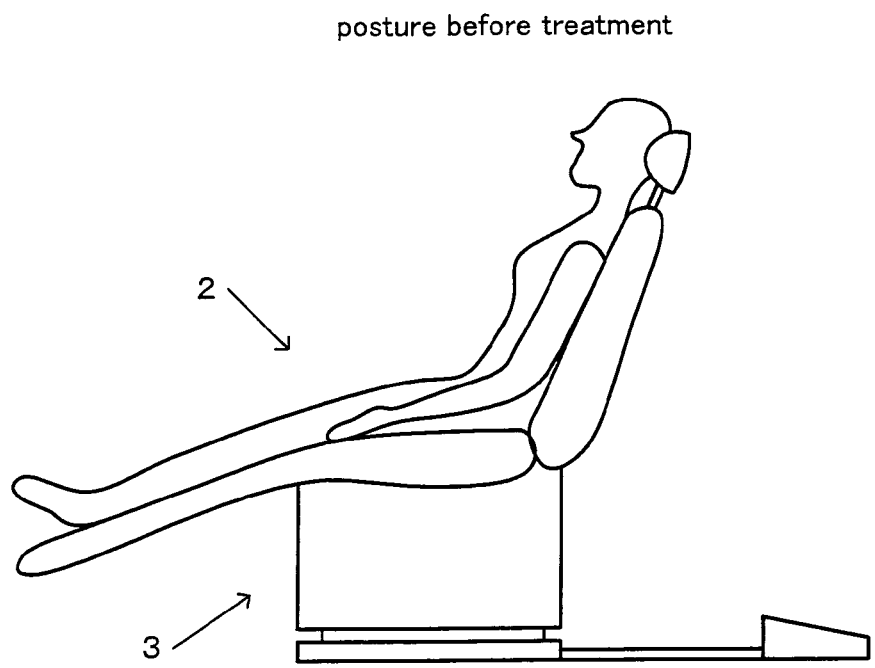
FIG. 15a shows that the model patient body receives medical treatment and FIG. 15b shows its facial expression (relaxed expression).
Figure 15B:
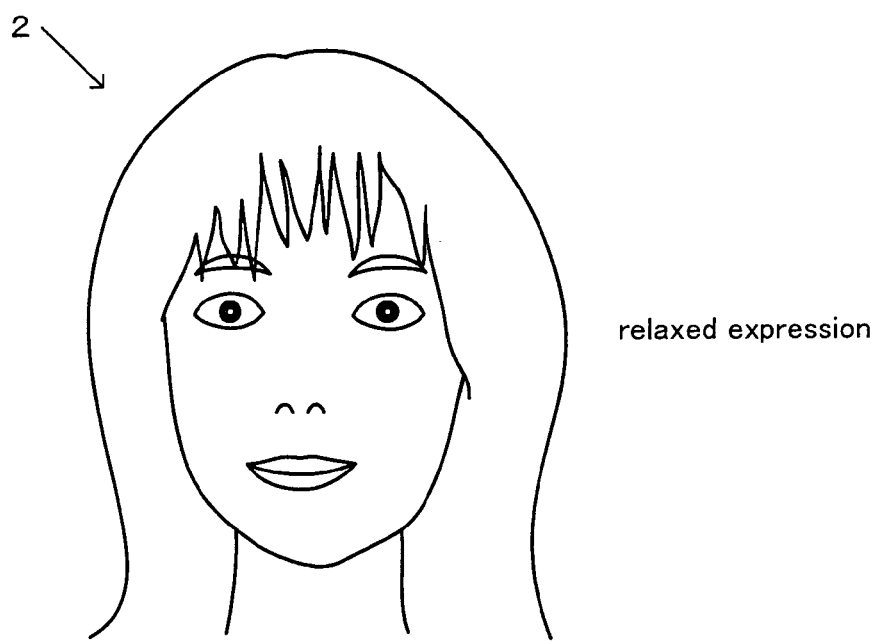
Figure 16A:
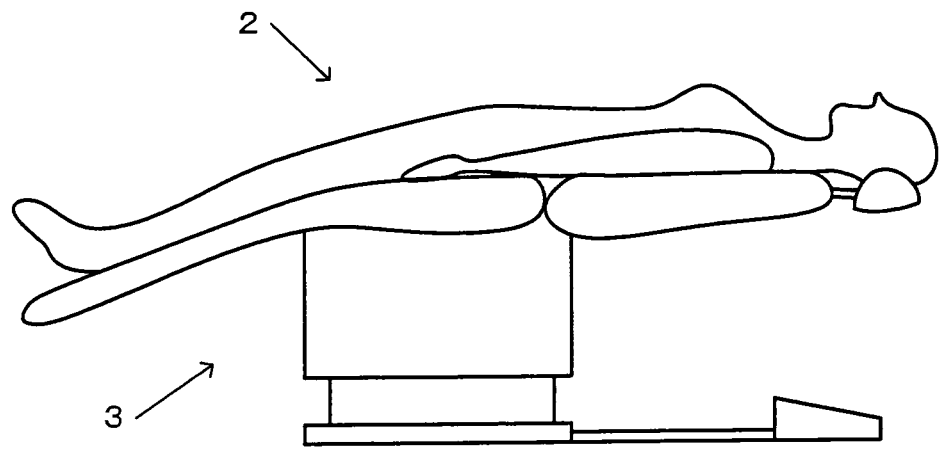
FIG. 16a shows that the model patient body receives t medical treatment and FIG. 16b shows its facial expression (somewhat uneasy expression).
Figure 16B:
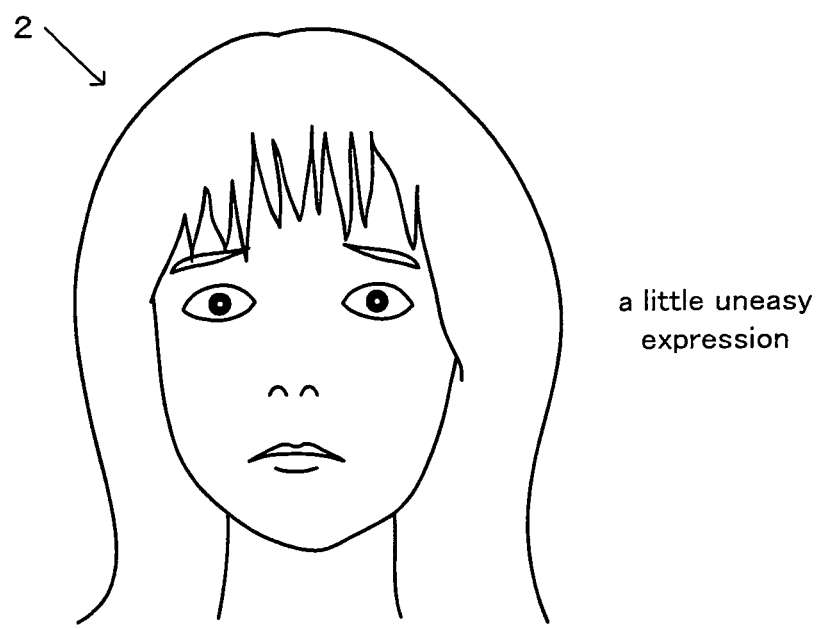
Figure 17A:
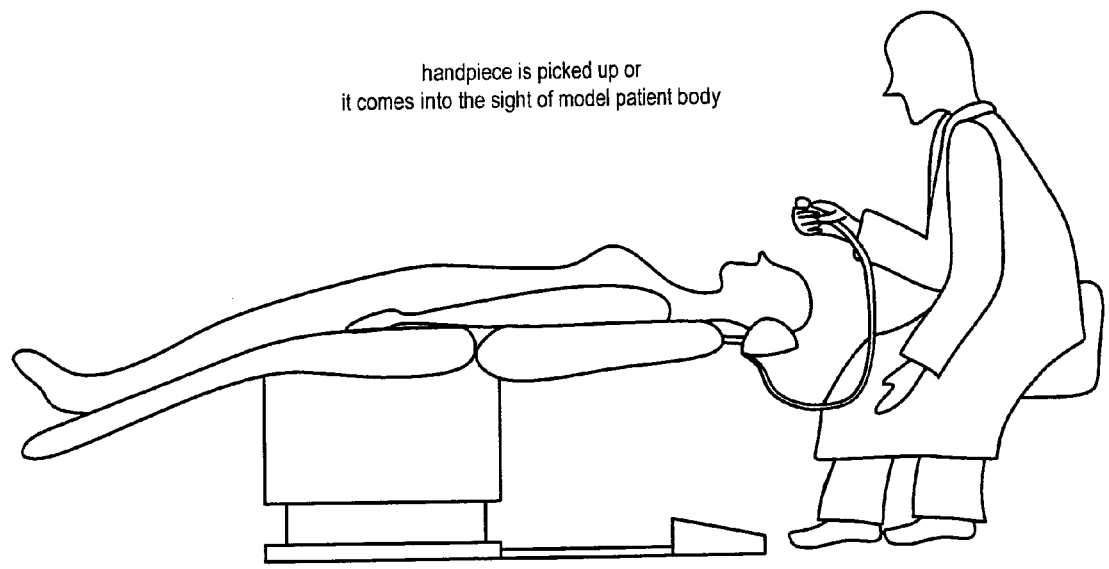
FIG. 17a shows that the model patient body receives medical treatment and FIG. 17b shows its facial expression (more uneasy expression).
Figure 17B:

FIG. 14 is a table showing the change of expression and body movement of the model patient body 2 incorporating the model patient body driving means D and the sensor constituting the examination receiving status detection means C.

This table shows the expression and movement of the model patient body 2, the column is divided into a head, a jaw (mouth), eye (therearound), breath, movement, and voice and the row is divided into normal (before treatment), right before treatment (direction of face, angle of pillow), during treatment (painful, unpleasant), and after treatment. As shown in the table, the head moves passively according to the setting of the examination table right before treatment, the control means observes the examination detection signal, several kinds of driving means housed in the head model are actuated to keep the face in a relaxed expression if there is no trouble, however, the face is changed to be unpleasant, painful, or vomiting expression when abnormality is detected.

The jaw is closed in a normal condition (before treatment) and is actively opened right before treatment (direction of face, angle of pillow). The control means observes the examination detection signal and upon detecting an abnormal condition, the jaw shows movements necessary to change the expressions like unpleasant, painful, or vomiting.

The eyes (therearound) are similarly changed. As to breath, exhalation and inspiration are repeated at a slow pace at a normal condition (before treatment), but when the control means detects abnormality by the examination receiving status detection signal, the breath is changed into a necessary speed because the expression is changed to show unpleasant, pain and vomiting expression and the like.

As an example of movement in the table, an elbow is shown and an arm is raised up when pain is felt. Further as to voice, in case of unpleasant, pain, or vomiting expression, corresponding voice is output and after treatment, a word of thanks is produced.

The trainee can execute training while experiencing similar reactions to the case he examines an actual patient as a treatment object because the model patient body 2 reproduces such movement and expression change during training. The change of expression in the present invention may include the movement change of the trunk portion, the arm portion, the leg portion and audio output in addition to the facial expression other than only the facial expression change of the model patient body 2.

FIG. 15-FIG. 18 show a treatment operation to the model patient body and an example of expression change appeared on the face. The model patient body 2 is placed on the examination table 3 as shown in FIG. 15a and shows a relaxed expression as shown in FIG. 15b at the position before treatment. When the examination table 3 goes up and tilts to move to a treatment position as shown in FIG. 16a, a little uneasy expression is appeared as shown in FIG. 16b. Further a hand piece is taken out at the treatment position and its movement comes into the sight of the model patient body as shown in FIG. 17a, a further uneasy expression is appeared as shown in FIG. 17b. When the handpiece is inserted into the oral cavity to execute procedure as shown in FIG. 18a and the medical instrument is pushed on the tooth more than necessary and pain is felt, a painful expression is shown like FIG. 18b. And further the handpiece touches the throat, a vomiting expression is shown like FIG. 18c. Therefore, accompanying these movement and expression changes during training, the same reaction when an actual patient is examined can be experienced and a training can be studied so as not to take painful or inappropriate examination to an actual patient.

Next, the model patient body control/operation means G is explained. The model patient body control/operation means G can be used while displaying on the display means 42 of the information processing unit 4 as GUI. The model patient body control/operation unit G comprises the memory means G1 capable of registering information on the posture, movement and expression of the model patient body 2 as mentioned above and the expression selection means G2 and in the memory means G1 a plurality of expressions showing normal, uneasy, pain, vomiting are programmed and stored as the expression of the model patient body 2 in advance. Therefore, by such structure, the posture detection signal output from the posture detection means A, the medical instrument status detection signal output from the medical instrument status detection means B, the examination receiving status detection signal output from the examination receiving status detection means C, the picture signal output from the imaging means 64, and the audio signal collected by the microphone 65 are received via the control means I, stored in the memory means G1 in chronological order, and the stored information can be displayed on the display means 42 of the information processing unit 4 or the display means 5 provided on the instrument table 1.

Figure 19:
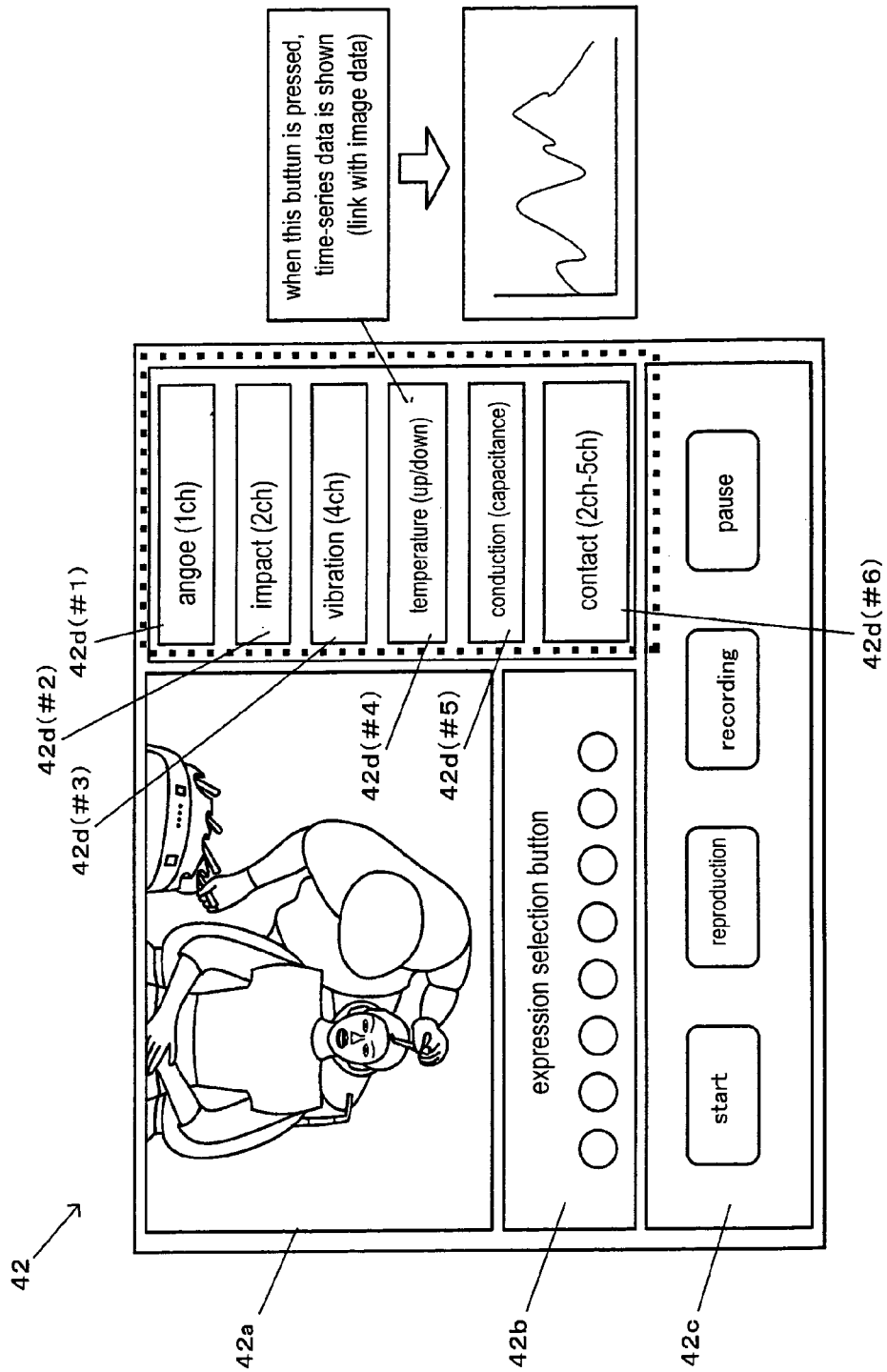
FIG. 19 shows a display screen of an information processing unit.

FIG. 19 shows a display example in case of GUI structure. The display means 42 comprises a display 42a for displaying a camera image, an expression selection button display 42b as an expression selection means for storing the expression of the model patient body 2 and for reproducing it, a camera operation display 42c for recording and reproducing with the camera, and a sensor selection button displays 42d(#1)-42d(#6) as a display selection means for calling up several kinds of sensors embedded in the model patient body 2. Each selection button of the sensor selection button display 42d(#1)-42d(#6) is linked with the corresponding sensor and angle, impact, vibration, temperature (increase, decrease), conductivity (capacitance), the physical amount of contact detected by the liked sensor are monitor displayed in real time on the camera image display 42a as the numerical value or as the time series graph when any one of selection button displays is operated, thereby being capable of objectively understanding the examination receiving status during medical examination.

Accordingly, when the selection button display 42b provided on any one of the above-mentioned display is selected by means of a mouse and the like, the display 42a is switched to a corresponding screen in order to show the necessary information or image, thereby being enable to monitor display the necessary information and to execute control. Each expression selection button display 42b is allotted with the above-mentioned expression and movement of the model patient body 2 to be stored, so that the expression and movement of the model patient body 2 can be optionally changed without during examination, for example, by operating the expression selection button display 42b. According to such a model patient body control/operation unit G, in addition to the original control operation that the medical treatment of the trainee is automatically reflected on the expression or body movement of the model patient body 2, the trainer can control the expression of the model patient body 2 by judging the situation of the trainee and by operating the expression selection button display 42b.

The information processing unit 4 stores at least more than one standard signal among the examining status standard signal and the examination receiving status standard signal which are evaluation standard in the storage means E from the storage medium such as CD-ROM. And the stored examining status standard signal and examination receiving status standard signal are compared with more than one of the detection signal among the examining status detection signal and the examination receiving status detection signal based on the training of the trainee and the training evaluation result is output. The information processing unit 4 is also constructed as the training result evaluation means F for outputting the training evaluation result for the model patient body 2. According to such a structure, the evaluation on the trainee can be calculated based on a predetermined algorism, the result can be ranked as A, B, C and the like to be shown on the display means 42, and appropriate advice can be given by displaying and reproducing the inappropriate examining operation on the display means 42.

Accordingly, the present invention is characterized in that the medical training apparatus M comprises the instrument holder 1b having medical instruments 11a-11e, the model patient body 2 simulating a patient to be examined, and the examination table 3 on which the model patient body 2 is placed, the medical training apparatus M has more than one of the medical instrument status detection means B for detecting the working status of the medical instruments 11a-11e and the examination receiving status detection means C for detecting the situation of the model patient body 2 under medical treatment or examination, the model patient body driving means D for changing the expression of the model patient body 2, the memory means E for storing the medical instrument status detection signal output from the medical treatment status detection means B for detecting the working status of the medical instruments 11a-11e or the examination receiving status detection signal output from the examination receiving status detecting means C, and the training result evaluation means F for comparing the evaluation standard stored in the memory means E in advance and the detection result based on more than one of the medical instrument status detection signal and the examination receiving status detection signal and for outputting the evaluation result of the training. Either one of the medical instrument status detection signal or the examination receiving status detection signal may be compared with the evaluation standard stored in the memory means E in advance, however, it is preferable that both of them may be compared with the evaluation standard and the evaluation result is obtained.

According to the training apparatus of the present invention, the model patient 2 may move the eyes restlessly up-and-down and right-and-left in a relaxed condition before examination to look on the examination room. When an operator picks up the medical instruments 11a-11e from the instrument holder 1b of the instrument table 1 or they are driven by operating the foot controller 12a, the model patient body 2 changes the expression to uneasy expression from the relaxed expression, closes the eyes, and widely opens the mouth before the examination is started. At the time of cutting treatment, the model patient body 2 shows further uneasy expression, and when the medical instruments 11a-11e contact the tooth 23d and the tooth 23d is cut by an excess force, it bats the eyes showing painful expression and changes the opening degree of the mouth. Further, the medical instruments 11a-11e contact the deep portion of the throat, the model patient body 2 can be changed to the expression of vomiting. Further the voice corresponding to the examination status can be reproduced and output from the audio output means 21f provided for the model patient body.

Thus, when the model patient body is in an inappropriate posture and the trainee is going to operate the examination table, or he handles the medical instruments inappropriately, such an operation can reflect the expression of the model patient body such as uneasy expression or painful expression by detecting not only the examination receiving status detection signal incorporated in the model patient body but also the operation signal of the examination table or the medical instruments which lead the anxiety and pain of the actual patient, thereby being useful to improve inappropriate operation to the medical instrument and the examination table.

Figure 26:
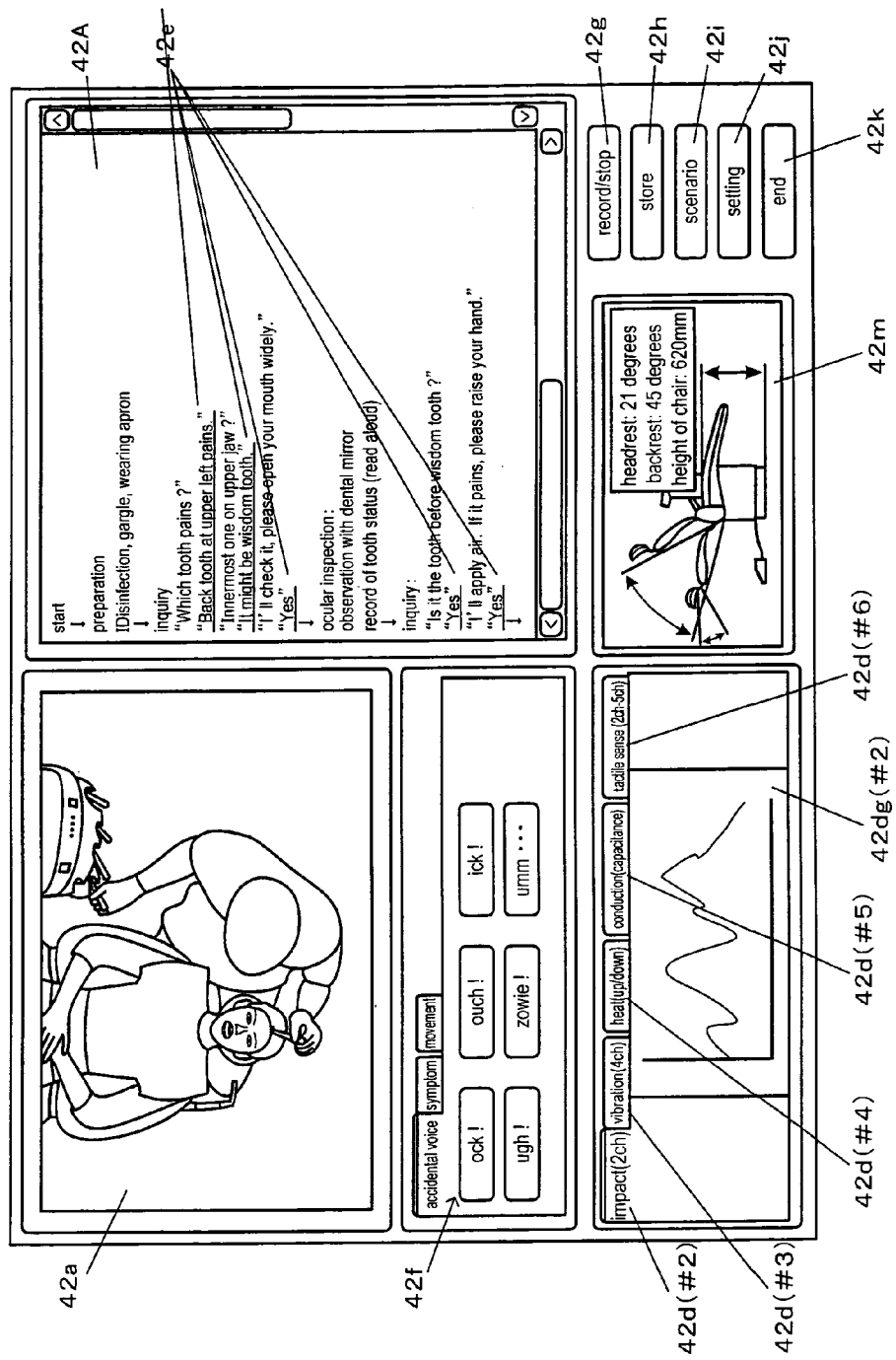
FIG. 26 shows when a scenario mode is displayed on GUI of FIG. 19.

FIG. 26 shows other embodiment of GUI of FIG. 19 in which a scenario mode is shown on a scenario display 42A. A training scenario stored in the memory means E in advance is shown on the scenario display 42A and the training is proceeded while the trainee and the model patient body operated by the trainer have a conversation. The reference numerals 42e, 42f are dialogue of the model patient body and the model patient body is designed to respond when the trainer clicks with a mouse while having conversation with the trainee.

Figure 27:
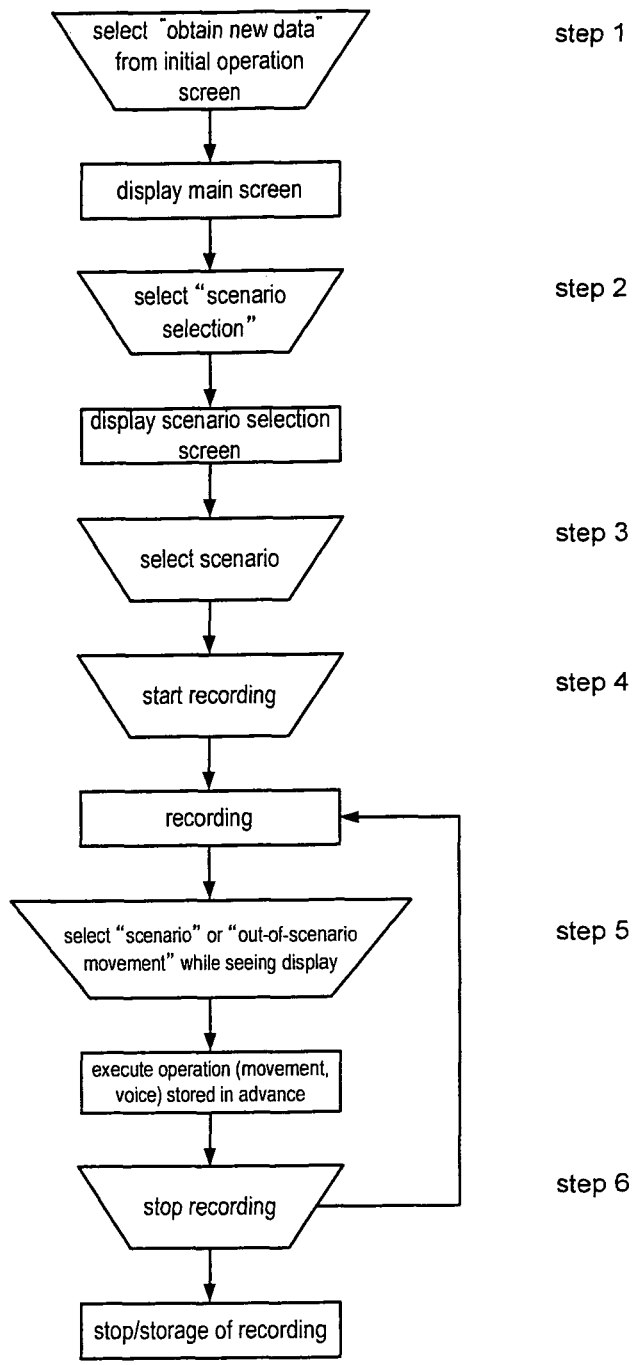
FIG. 27 shows a flow chart for selecting the scenario.

The scenario in FIG. 26 shows an upper jaw molar root trunk treatment, a front tooth hypersensitivity and a treatment of C4 for No.5 at a lower jaw and they can be selected at the selection of scenario (step 3) in the flow chart in FIG. 27. Several scenario can be prepared and stored corresponding to the training in addition to the above-mentioned one. Further a new scenario may be produced and stored in the memory means E.

Further, the information of each sensor S to be input into the sensor selection button display 42d(#2)-42d(#6) is shown as a graph of which vertical axis shows the sensor output and of which horizontal axis shows the time on the display 42dg (#2). The sensor output is shown with the maximum value (Max), the standard value (Base), and the minimum value (Min) set by the setting button 42j in advance, and when it shows the maximum value, the trainer appropriately clicks with a mouse to make the model patient body generate an accidental voice or show accidental movement out of the scenario, and the training is proceeded.

The angle of the back seat and the headrest and the height of the sitting seat of the examination table 3 (sensor information corresponding to the sensor selection button 42d(#1) in FIG. 19) is designed to be always shown on a display 42m.

Next, the flow chart in FIG. 27 is explained. The flow in FIG. 27 is shown on the scenario display 42A in FIG. 26 to be set. The step 1 is a process of obtaining a new data in which an initial screen at start up is shown and several kinds of selection buttons are shown such as a data reference button (not shown) for reproducing the previously obtained video, a scenario button 42i for producing and editing the scenario, a new data obtaining button (not shown) for photographing the training status and the like. The step 2 is a process of selecting a scenario selection button (not shown) in which the scenario selection button for executing training corresponding to the scenario in response to the new data obtaining button selected in the step 1 and a free training button (not shown) for executing training without restriction are shown. The step 3 is a process for selecting a scenario of training to be executed from the displayed titles of a plurality of trainings. The step 4 is a process of recording the training by means of the imaging camera 64 shown in FIG. 1 when the scenario selected in the step 3 is shown and a record/stop button 42g is pressed. The step 5 is a process for proceeding the training while the trainer selectively uses a scenario operation button 42e for producing voice in response to the dialogue of the model patient body in the scenario and an out-of-scenario button 42f for producing accidental voice such as "ack" or "ugh" or accidental movement, which are not described in the scenario. The step 6 is a process for completing the training scenario and stopping recordation by pressing the record/stop button 42g again.

Other than the trainer operates the accidental voice production or movement out of the scenario, the model patient body may be designed to show a painful expression and in addition may produce such voice like "Ouch" and raise the arm when the output of each sensor shows the maximum value. The voice production and movement can be set in the memory means E in advance, and the expression of the model patient body may be changed corresponding to the kinds of the sensor and the output value or the expression, voice and movement may be randomly combined to be shown.

After executing each step and the training is completed, the recorded data is stored by pressing a storage button 42h. Further, the training can be assessed by means of the above-mentioned training result evaluation means F based on the stored data. In addition, when a satisfactorily training result is not obtained or the training is reviewed, the same scenario can be repeatedly used.

Figure 20:
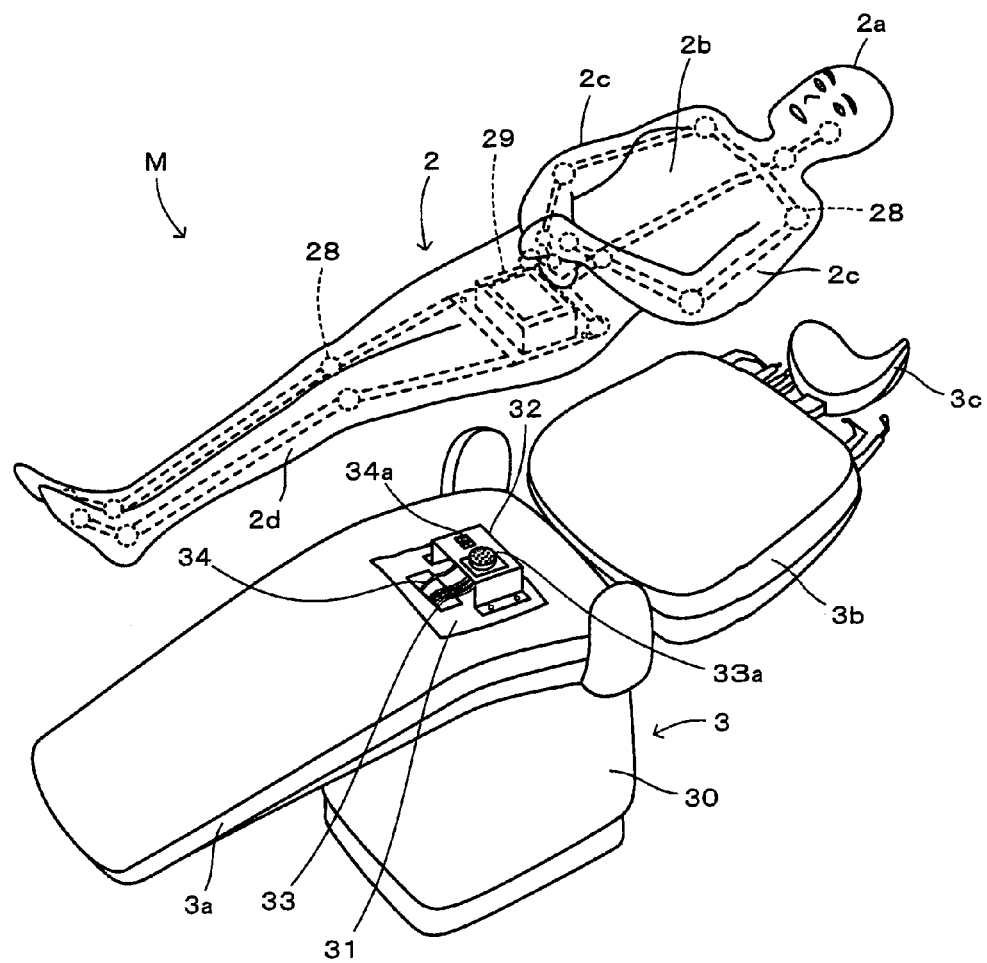
FIG. 20 is a perspective view showing one embodiment of the mounting relation of the model patient body and the treatment table and the connecting relation of a driving operation medium for a model patient body driving means.
Figure 21:
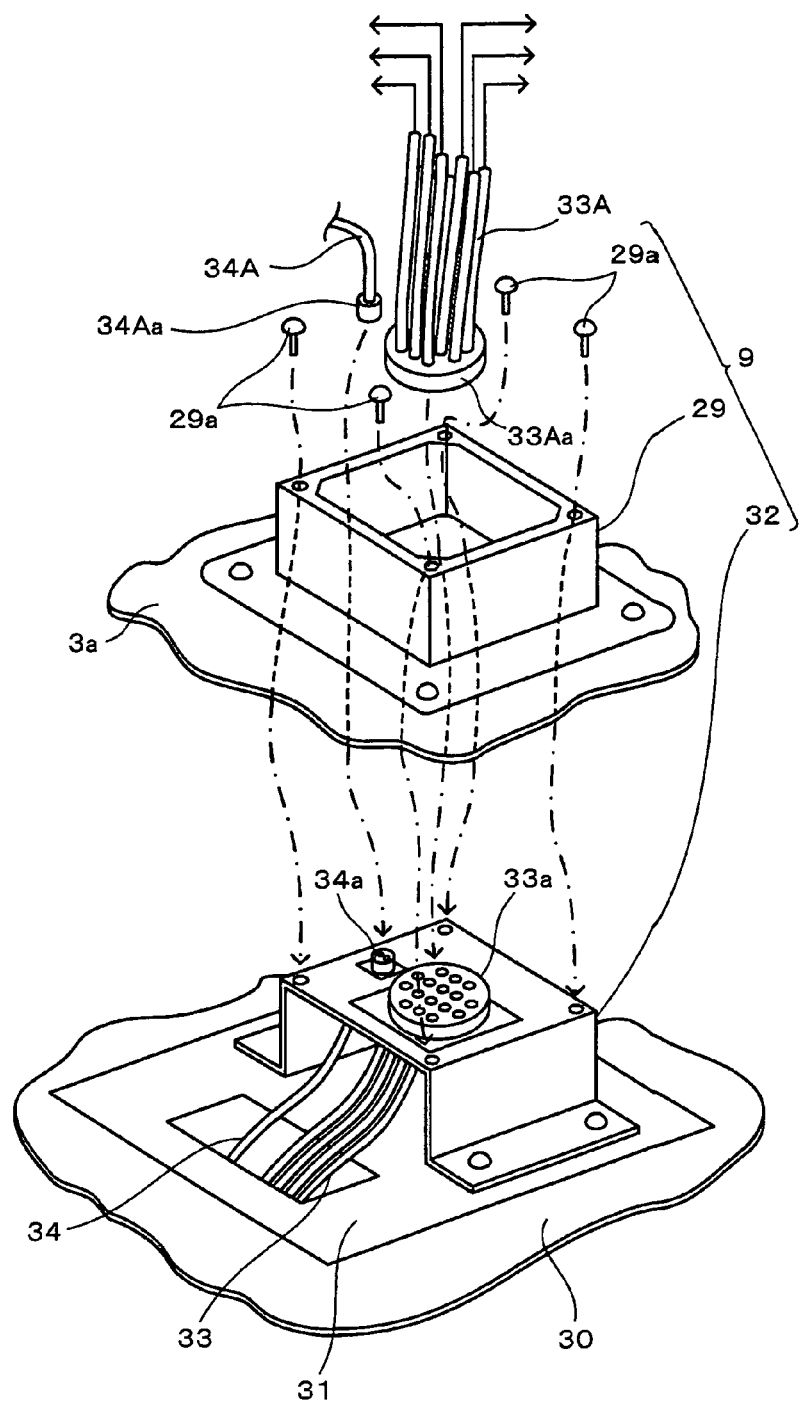
FIG. 21 is a broken perspective view showing the connecting portion of the model patient body and the treatment table in the same embodiment.

FIG. 20 and FIG. 21 show one embodiment of the medical treatment apparatus M in which the model patient body 2 and the examination table 3 are detachably coupled and the pipe line and the bundle of electric wires of driving operation medium for the model patient body driving means D are correspondingly detachable. In the figure, a model patient body fixing portion 31 exposed on the surface of the sitting seat 3a is formed on the upper face of the base 30 of the examination table 3 and a reversed concave metal fixture 32 for fixing the model patient body is fixed on the fixing portion 31. The reversed concave metal fixture 32 is attached with connectors 33a, 34a connected at the tip end of a liquid (water, air and the like) pipe line 33 and an electric wire bundle 34 (fluidic or electric driving system) for the driving operation medium of the model patient body driving means D led from the base 30.

On the other hand, a fixing metal 29 which is a rectangular frame for fixing the model patient body is assembled at the lower face of the hip of the model patient body 2 and the fixing metal 29 and the metal fixture 32 at the examination table 3 side are formed so as to be fitted from up and down, the fitted fixing rackets 29, 32 are fastened with screws 29a..., thereby constituting a detachable coupling means 9 of the model patient body 2 and the examination table 3. The model patient body 2 includes a liquid (water, air and the like) pipe line 33A for the driving operation medium of the model patient driving means D and an electric wire bundle 34A (fluid or electric driving system) and connectors 33Aa, 34Aa are connected at the tip ends of the flow pipe line 33A and the electric wire bundle 34A, respectively. The connectors 33Aa, 34Aa are designed to be capable of connecting with the connectors 33a, 34a when the both fixing brackets 29,32 are fastened and fixed via the opening of the frame-shaped fixing metal 29 by means of screws 29a.... These connectors comprise a rapid joint and the like so as to be easily connectable each other by one-touch operation. Further, the connectors may be designed to be in a predetermined direction by providing cutout, thereby eliminating connection mistake.

The model patient body control/operation unit (not shown) is housed in the base 30 of the examination table 3, the model patient body 2 is placed and coupled on the examination table 3 by means of the coupling means 9 as mentioned above, the connectors 33a, 34a at the examination table side and the connectors 33Aa, 34Aa at the model patient body side are connected each other, thereby executing the above-mentioned several trainings. In this case the model patient body control/operation unit may be separate from the examination table 3, the fluid pipe line and the electric wire bundle of the driving operation medium may be introduced into the examination table 3 from the model patient body control/operation unit separately provided around the examination table 3 and the similar structure as mentioned above may be achieved. The coupling position of the model patient body 2 and the examination table 3 may be between the back seat 3b and the trunk (back) 2b of the model patient body 2, between the sitting seat 3a and the crural area (leg) 2d of the model patient body 2, or between the headrest 3c and the head 2a of the model patient body 2, other than the position shown in the figure.

Because the model patient body 2 and the examination table 3, and the fluid pipe line and the electric wire bundle thereof are detachably coupled and connected, the model patient body 2 can be detached to easily execute maintenance and several kinds of training can be achieved by appropriately combining different types of the model patient body 2 and different types of the examination table 3. In addition, fluid such as water and air and electricity are used as the driving operation medium of the model patient body drive means, so that such operating medium can be easily supplied from the examination table 3 or the model patient body control/operation unit. Further, if the model patient body control/operation unit is provided for the examination table 3, the electric wiring and piping into the model patient body 2 are designed not to seen from outside.

FIG. 22a, FIG. 22b, FIG. 22c and FIG. 23 show other embodiment of the medical training apparatus M in which the model patient body 2 and the examination table 3 are detachably coupled and accordingly the pipe line and the electric wire bundle of the driving operation medium to the model patient body drive means D are detachably connected. In the figure, a model patient body fixing base 32A exposed from the cutout portion 3aa of the sitting seat 3a is formed on the upper face of the base 30 of the examination table 3 and a fixing bracket 29A is pivotally provided for the articulated mechanism 28 corresponding to the waist of the model patient body 2, and the fixing bracket 29A is capable of being fastened and fixed to the model patient body fixing base 32A by means of screws 29a, ..., thereby constituting the detachable coupling means 9 of the model patient body 2 and the examination table 3 (see FIG. 22b).

The fluid pipe line 33 and the electric wire bundle 34 as mentioned above are led from the base 30 of the examination table 3 and the connectors 33a, 34a are joined at the tip end thereof. The model patient body 2 houses the fluid pipe line 33A and the electric wire bundle 34A as mentioned above, the connectors 33Aa, 34Aa are joined their tips. The connectors 33Aa, 34Aa of the model patient body side are located in the crural area 2d of the model patient body 2 and a connector attaching board 35 is fixed at this position by means of screws 35a (see FIG. 23). The connectors 33a, 34a at the examination table side and the connectors 33Aa, 34Aa of the model patient body side are connected respectively via the connector attaching board 35. Namely, the connectors 33Aa, 34Aa at the model patient body side are attached on the connector attaching board 35, the right crural area of the model patient body 2 is opened from the side or from the lower face as shown with one dotted line in FIG. 22b and the connectors 33a, 34a of the examination table side are connected to the connectors 33Aa, 34Aa of the model patient body side attached to the inside connector attaching board 35. This connection is achieved such that hexagon cap nuts 33b, 34b attached to the connectors 33a, 34a at the examination table side are screwed to be fastened from the arrows shown in FIG. 23 relative to male screws 33Ab, 34Ab formed on the connectors 33Aa, 34Aa of the model patient body side. Accordingly, the fluid pipe line 33 and the electric wire bundle 34 at the examination table side and the fluid pipe line 33A and the electric wire bundle 34A at the model patient body side are connected respectively, thereby establishing a fluid system connection and an electric drive system connection therebetween.

Figure 22A:
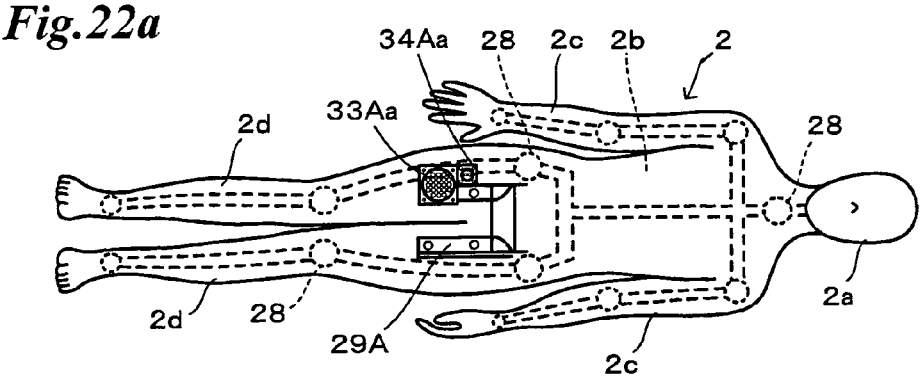
Figure 22B:
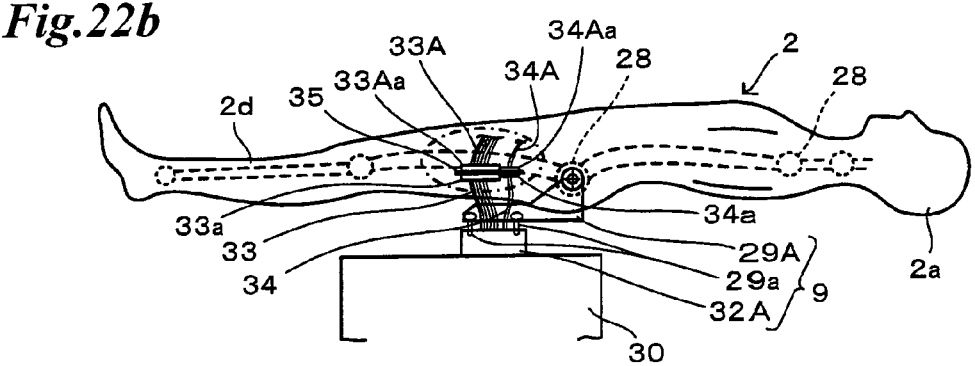
Figure 22C:
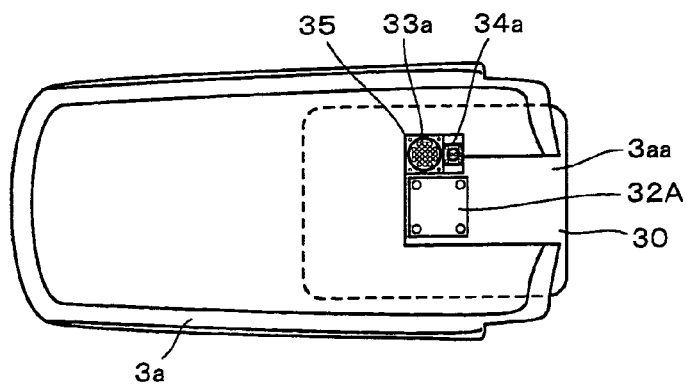
Figure 23:
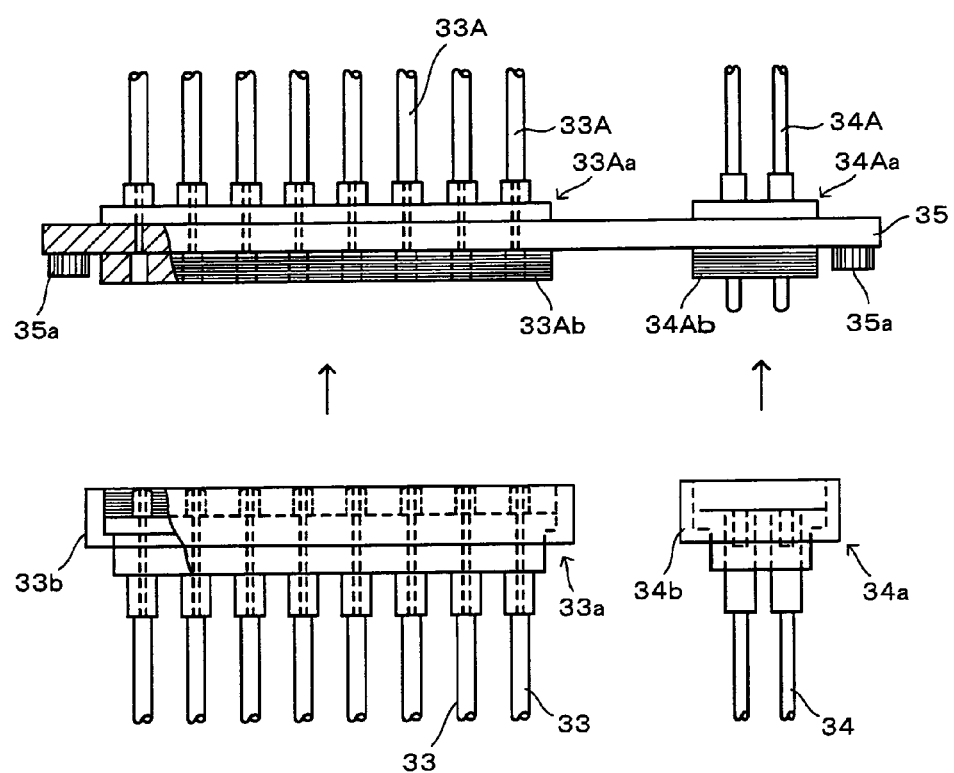
FIG. 23 is a partially cutaway exploded view of the connecting portion of the driving operation medium in the same embodiment.

The sitting seat 3a and the back seat 3b of the examination table 3 are not shown in FIG. 22b.

Thus, the fluid pipe lines and the electric wire bundles of the model patient body 2 and the examination table 3 are detachably coupled and connected, so that the model patient body 2 can be detached, maintenance can be easily done, and various trainings can be achieved for different types of model patient bodies 2 or different types of examination tables 3. In this embodiment, the fixing bracket 29A constituting the coupling means 9 is pivotally attached to the articulated mechanism 28 corresponding to the waist (rotary center of the back) of the model patient body 2 and when the pivot portion accords with the tilting center of the back seat 3b of the examination table 3, the back displacement (displacement of the back of the model patient body 2 and the back seat 3b) is not generated, so that the back of the model patient body 2 follows the tilting movement of the back seat 3b and the raising and tilting operation of the back of the model patient body 2 can be passively done.

Figure 24A:
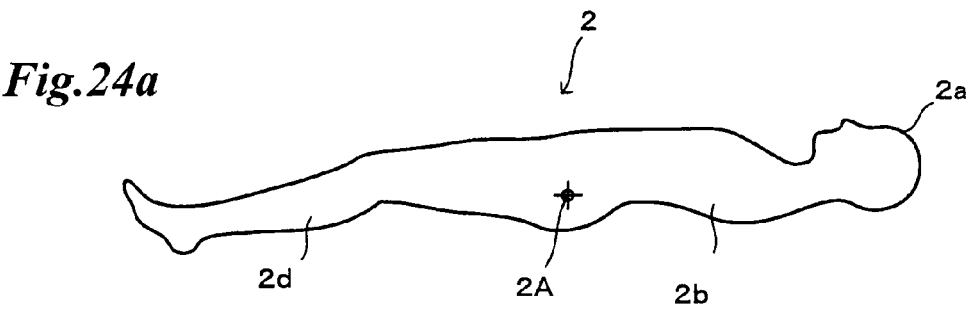
Figure 24B:
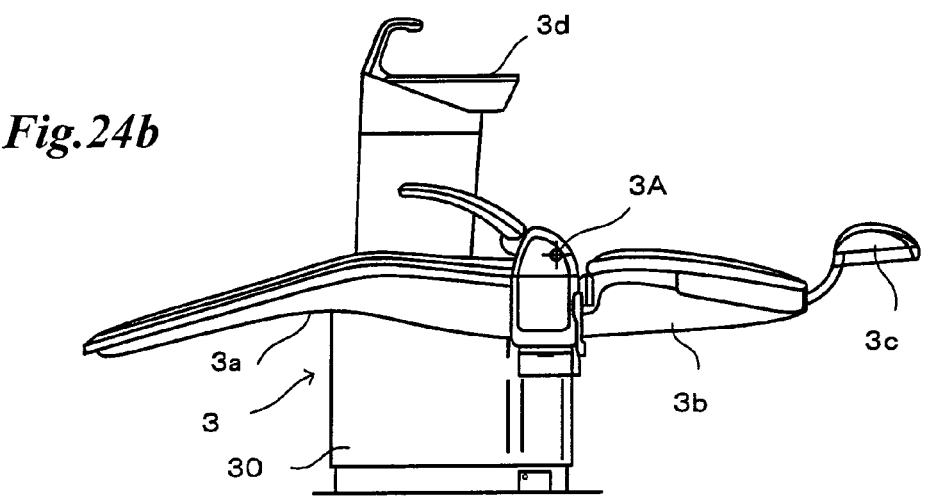
Figure 24C:
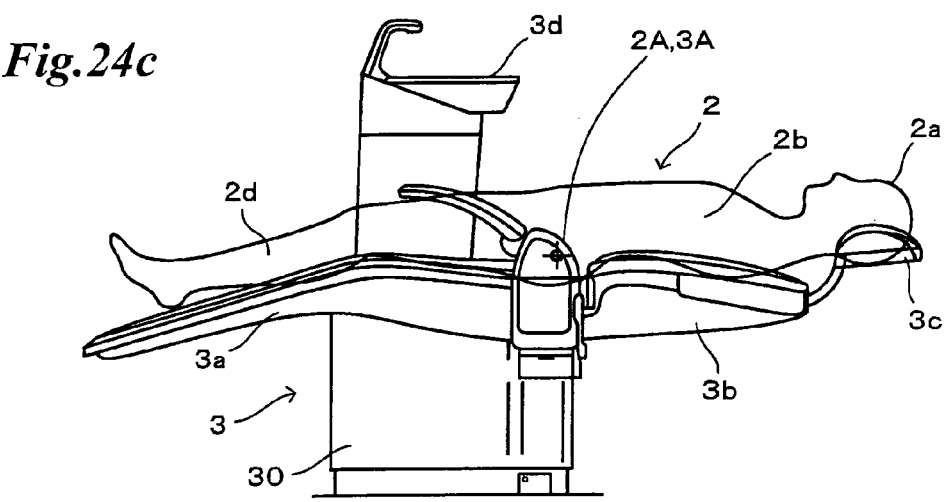

FIG. 24a, FIG. 24b, FIG. 24c show how the model patient body 2 is place and fixed on the examination table 3 while according their tilting centers. As shown in FIG. 24a, the model patient body 2 has a tilting center 2A at the back by pivotal attachment of the articulated mechanism 28 corresponding to the waist thereof and the fixing bracket 29A. On the other hand, as shown in FIG. 24b, the examination table 3 has a tilting center 3A based on the tilting mechanism (not shown) provided for the connecting portion of the sitting seat 3a and the back seat 3b. When the model patient body 2 is placed on and coupled with the examination table 3, both tilting centers 2A, 3A are met as shown in FIG. 24c. Under such a coupled and placed condition, the back displacement is not caused and the back of the model patient body 2 can be raised and tilted following the tilting operation of the back seat 3b. Therefore, raising operation and tilting operation of the model patient body 2 which are remarkably resembles those of the actual patient can be performed without providing a driving means for raising and tilting the back for the model patient body 2. If the back seat 3b of the examination table 3 and the back of the model patient body 2 are fixed by means of a some sort of a coupling means, the model patient body 2 is prevented from folding up forwardly when the back seat 3b raises.

Figure 25:
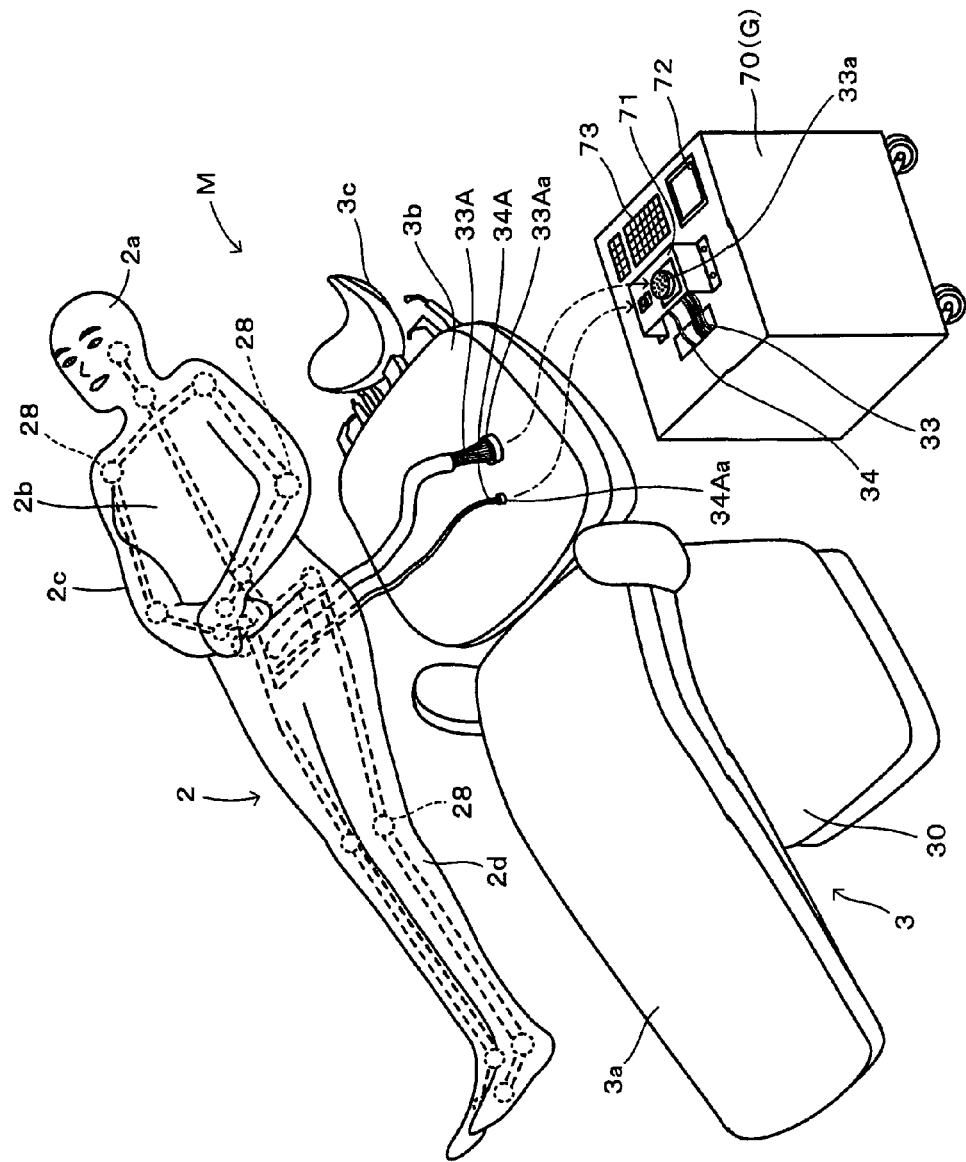
FIG. 25 is a perspective view showing other embodiment of the relation of the model patient body and the treatment table and the connecting relation of a driving operation medium for a model patient body driving means.

FIG. 25 shows a further embodiment of the relation of the model patient body 2 and the examination table 3 and of the connecting relation of the driving operation medium for the model patient body driving means. In this embodiment, a movable operation box 70 is provided as the model patient body control/operation unit G around the examination table 3 and has a supply source of the operating medium and a functional portion similar to the information processing unit 4 comprised of GUI as mentioned above. The fluid pipe line 33 and the electric wire bundle 34 are led from the upper face of the control box 70 and the connectors 33a, 34a are joined at their tip ends. The connectors 33a, 34a are attached on a connector attaching board 71 fixed on the control box 70. A display means 72 such as a liquid monitor and an operation means 73 such as a keyboard and a mouse are provided on the upper face of the control box 70 like the information processing unit 4.

The fluid pipe line 33A and the electric wire bundle 34A are housed in the model patient body 2, they are led from the side of the model patient body 2 and the connectors 33Aa, 34Aa are connected at the tip ends thereof. The model patient body 2 is designed to be only placed on the examination table 3 and the medical training apparatus M is constituted by connecting the connectors 33a, 34a and the connectors 33Aa, 34Aa, respectively.

According to the medical treatment apparatus M constructed such that the model patient body 2 is placed on the examination table 3 and the connectors 33a, 34a and the connectors 33Aa, 34Aa are connected respectively, the trainee can execute medical training as mentioned in the above embodiment and the trainer can conduct training using the operation box 70 as GUI like the above-mentioned information processing unit 4.

The embodiment in FIG. 25 shows the model patient body 2 is only placed on the examination table 3, however, they may be coupled and fixed by means of a some sort of coupling means. In such a case the coupling means may be detachable like the above-mentioned embodiment and a detachable connection structure such as operating medium pipe line may be incorporated. Further, the operation box 70 is designed to be movable, however, it may be fixedly provided on a floor, the side and the like of the examination table 3.

Further, the examination table 3 and the operation box 70 may be connected with wire or wireless, the detected status of the medical instrument is sent to the GUI to be shown on the display of the GUI, and the status of the medical instrument and the information from each sensor may be linked to be used during training or for evaluation, although those members are not shown in the figure. Otherwise, the examination table 3 and the operation box 70 may not be connected, only the information from each sensor provided in the model patient body may be shown on the display of the GUI, and only the information from each sensor may be used during training or for evaluation.

The embodiment is explained as a dental medical training apparatus in the above, however, the present invention can be used as a medical training apparatus in the medical department other than dentistry, such as otorhinolaryngology, ophthalmology, obstetrics and gynecology, surgery, dental surgery, internal medicine, clinical psychiatry, neurology, and radiology by changing the structure of the model patient body 2 and the detection means. Further, the model patient body 2 is designed as the entire human model from the head to the leg in the above-mentioned explanation, however, it may be only a head model for a dental, otologic or ophthalmic training apparatus, and it may be fixedly or detachably attached to the headrest of the examination table.

The invention claimed is:

1. A medical training apparatus comprising an instrument holder with a medical instrument, an android-type robot simulating a patient subject to medical treatment or examination, and an examination table on which said android-type robot is placed, said medical training apparatus comprising:
   a posture detection means for detecting the posture of said examination table;
   a medical instrument status detection means for detecting the working status of said medical instrument;
   an examination receiving status detection means for detecting the situation of said android-type robot in medical treatment or examination; and
   an android-type robot driving means housed in said android-type robot; wherein
   said android-type robot driving means changes the facial or body expression of said android-type robot, depending on combination of at least one of the posture detection signal output from said posture detection means and the medical instrument status detection signal output from said medical instrument status detection means, and the examination receiving status detection signal output from said examination receiving status detection means.

2. The medical training apparatus as set forth in claim 1, further comprising a display means for displaying at least one of said posture detection signal, said medical instrument status detection signal and said examination receiving status detection signal.

3. A medical training apparatus comprising an instrument holder with a medical instrument, an android-type robot simulating a patient subject to medical treatment or examination, and an examination table on which said android-type robot is placed, said medical training apparatus comprising:
   at least one of a medical instrument status detection means for detecting the working status of said medical instrument and an examination receiving status detection means for detecting the situation of said android-type robot in medical treatment or examination;
   an android-type robot driving means for changing the facial or body expression of said android-type robot;
   a memory means for storing the medical instrument status detection signal output from said medical instrument status detection means or the examination receiving status detection signal output from said examination receiving status detection means; and
   a training result evaluation means for evaluating the result of medical training after comparing an evaluation criteria stored in advance in a memory means with the detection result based on at least one of said medical instrument detection signal and said examination receiving status detection signal.

4. The medical training apparatus as set forth in claim 1 or 3, further comprising:
   a display means for displaying at least one of said posture detection signal, said medical instrument status detection signal and said examination receiving status detection signal; and an android-type robot control/operation means for controlling said android-type robot driving means by a selecting operation.

5. The medical training apparatus as set forth in claim 4, wherein:
said android-type robot control/operation means has a memory means for storing different facial or body expressions in advance by combining movement of eyes, eyelids, and a mouth of said android-type robot driving means and has an expression selection means for selecting a specific expression from the different expressions in face or body, and
said android-type robot driving means is controlled and driven by operating said android-type robot control/operation means so as to perform the expressions selected by said expression selection means.

6. The medical training apparatus as set forth in claim 1 or 3, wherein said examination table comprises a sitting seat movable up and down, a tiltable back seat connected to the rear end of said sitting seat, and a tiltable headrest connected to the upper end of said back seat.

7. The medical training apparatus as set forth in claim 1 or 3, wherein said android-type robot is connected to at least one of an electric driving system and a fluid driving system relative to said examination table.

8. The medical training apparatus as set forth in claim 1 or 3, wherein said android-type robot has a head model with eyes, a nose and a mouth cavity and said mouth cavity has a jaw model.

9. The medical training apparatus as set forth in claim 8, wherein said android-type robot driving means drives at least one of the eyes, eyelids, jaw and neck provided in said android-type robot.

10. The medical training apparatus as set forth in claim 1 or 3, wherein said medical instrument status detection means detects at least one of the following factors:
the voltage or the current value corresponding to the rotation number of the medical instrument;
the air pressure, the air flow amount, the frequency, the vibration number of said instrument when operated;
the suppress strength to an affected part of said android-type robot;
the detection signal of picking up said medical instrument from said instrument holder;
the operation signal of a foot controller connected to said examination table; and
the operation signal of an operation means provided in said medical instrument.

11. The medical training apparatus as set forth in claim 6, wherein said posture detection means detects at least one of the elevating position of said sitting seat, the tilting angle of said back seat, and the tilting angle of said headrest.

12. The medical training apparatus as set forth in claim 8, wherein said examination receiving status detection means has at least one of a contact sensor provided for a cheek member of said head model, and a temperature sensor, a contact sensor, an angle sensor, a pressure sensor, a conduction sensor, a vibration sensor, and an impact sensor provided for said jaw model.

13. The medical training apparatus as set forth in claim 1 or 3, wherein an imaging means is further provided for photographing the medical treatment or examination status of said android-type robot.

14. The medical training apparatus as set forth in claim 1 or 3, wherein said android-type robot has an audio output means for outputting a predetermined voice in response to said examination receiving status detection signal.

15. The medical training apparatus as set forth in claim 1 or 3, wherein said android-type robot is so constructed as to be detachably placed on said examination table via a coupling means.

16. The medical training apparatus as set forth in claim 15, wherein said android-type robot has a driving system connecting portion in said android-type robot driving means side, said connecting portion being detachable to at least one of a connecting portion of an electric driving system and a connecting portion of a fluid driving system provided in said examination table when coupled via said coupling means.

17. The medical training apparatus as set forth in claim 15, wherein:
said examination table has a sitting seat movable up and down, a tiltable back seat connected to the rear end of said sitting seat, and a tiltable headrest connected to the upper end of said back seat;
said android-type robot has a head portion, a trunk portion including a hip portion and a back portion, and a leg portion including a crural area; and
said coupling means is provided either between the trunk portion of said android-type robot and said sitting seat or said back seat of said examination table, between said sitting seat and said crural area of said model patient body android-type robot, or between said headrest of said examination table and said head portion of said android-type robot.

18. The medical training apparatus as set forth in claim 1 or 3, wherein:
an android-type robot control/operation means for controlling said android-type robot driving means is provided on or at the vicinity of said examination table;
said android-type robot control/operation means has a connecting portion for an electric driving system or a connecting portion for a fluid driving system; and
said android-type robot has a connecting portion for the driving system at said android-type robot driving means side detachably connecting with at least more than one of said connecting portions.

19. The medical training apparatus as set forth in claim 1 or 3, wherein a system stop switch for urgently stopping an operating portion of said examination table and said android-type robot is further provided.

20. The medical training apparatus as set forth in claim 19, wherein said system stop switch is provided for said examination table.

21. The medical training apparatus as set forth in claim 1 or 3, wherein:
an operating medium of said android-type robot driving means includes fluid such as gas and liquid; and
an operation switch for releasing the android-type robot in order to urgently remove a part of or all of the operating pressure of the fluid during operation is further provided.

22. The medical training apparatus as set forth in claim 21, wherein said operation switch for releasing the android-type robot is provided for said android-type robot or said examination table.

* * * * *